US012796678B2

(12) United States Patent
Bjerre et al.

(10) Patent No.: US 12,796,678 B2
(45) **Date of Patent: *Nov. 17, 2026**

(54) RODENT TRAP

(71) Applicant: ANTICIMEX INNOVATION CENTER A/S, Helsinge (DK)

(72) Inventors: Rasmus Skou Bjerre, Værløse (DK); Kristian Kisling-Møller, Virum (DK)

(73) Assignee: ANTICIMEX INNOVATION CENTER A/S, Helsinge (DK)

( * ) Notice: Subject to any disclaimer, the term of this patent is extended or adjusted under 35 U.S.C. 154(b) by 0 days.

This patent is subject to a terminal disclaimer.

(21) Appl. No.: 19/331,511

(22) Filed: Sep. 17, 2025

(65) Prior Publication Data

US 2026/0013493 A1 Jan. 15, 2026

Related U.S. Application Data

(63) Continuation of application No. 17/624,407, filed as application No. PCT/EP2020/067184 on Jun. 19, 2020, now Pat. No. 12,575,555.

(30) Foreign Application Priority Data

Jul. 5, 2019 (DK) ............................. PA201970443

(51) Int. Cl.

*A01M 23/30* (2006.01)
*A01M 23/24* (2006.01)
*A01M 31/00* (2006.01)

(52) U.S. Cl.

CPC .................................. *A01M 23/30* (2013.01)

(58) Field of Classification Search

CPC .............................. A01M 23/30; A01M 23/24

(Continued)

(56) References Cited

U.S. PATENT DOCUMENTS 1,588,083 A * 6/1926 Worsley ................ A01M 23/30 43/83
1,891,737 A * 12/1932 Stilson .................. A01M 23/30 43/83.5

(Continued)

FOREIGN PATENT DOCUMENTS

AU 2014203633 A1 7/2014
CN 102524233 A * 7/2012 ............ A01M 23/30

(Continued)

OTHER PUBLICATIONS

English-language Danish Search Report dated Dec. 12, 2019 (4 pages) from Priority Application PA 2019 70443.

(Continued)

*Primary Examiner* — David J Parsley
*Assistant Examiner* — Angelica Alejandra Almeida Bonnin
(74) *Attorney, Agent, or Firm* — Crowell & Moring

(57) ABSTRACT

The present invention concerns an animal trap (1) and a system or network of such traps. The trap (1) is a spring-loaded strike rat trap comprising at least one spring (2), a housing, at least one striker bar (10), at least one arming bar (20), at least one trigger plate (30) and at least one trigger (40). The spring is configured for biasing the bars moving them from one position, where the arming bar and trigger plate is releasably held by the trigger and in contact with a ready indicator (101) to indicate that the spring-loaded strike trap is armed, into at least one other position where the movement of each bar is stopped, after the spring-loaded strike trap has been triggered releasing the bars.

35 Claims, 14 Drawing Sheets

(58) Field of Classification Search
USPC .............................................................. 43/81
See application file for complete search history.

(56) References Cited

U.S. PATENT DOCUMENTS

| | | | | | |
|---|---|---|---|---|---|
| 2,517,928 | A * | 8/1950 | Richards | A01M 23/30<br>43/81 |
| 2,616,211 | A * | 11/1952 | Johnson | A01M 23/30<br>43/81 |
| 4,665,644 | A * | 5/1987 | Vajs | A01M 23/30<br>43/82 |
| 4,711,049 | A * | 12/1987 | Kness | A01M 23/30<br>43/81 |
| 4,719,718 | A * | 1/1988 | Kon | A01M 23/30<br>43/81 |
| 5,001,857 | A * | 3/1991 | McDaniel | A01M 23/30<br>43/92 |
| 5,148,624 | A * | 9/1992 | Schmidt | A01M 23/30<br>43/81 |
| 5,154,017 | A * | 10/1992 | Disalvo | A01M 23/30<br>43/81 |
| 5,172,512 | A * | 12/1992 | Bodker | A01M 23/30<br>43/81 |
| 6,137,415 | A * | 10/2000 | Rast | A01M 23/245<br>340/384.1 |
| 6,415,544 | B1 * | 7/2002 | Leyerle | A01M 23/26<br>43/90 |
| 6,508,031 | B1 * | 1/2003 | Johnson | A01M 23/30<br>43/88 |
| 6,655,077 | B1 * | 12/2003 | Trevino | A01M 23/30<br>43/81 |
| 6,807,767 | B1 * | 10/2004 | Schade | A01M 23/30<br>43/77 |
| 8,156,683 | B2 | 4/2012 | Slotnick | |
| 8,490,322 | B2 * | 7/2013 | Dobias | A01M 23/30<br>43/92 |
| 9,210,924 | B1 * | 12/2015 | Terrell | A01M 1/2027 |
| 9,258,990 | B1 * | 2/2016 | Harvey | A01M 23/245 |
| 9,603,351 | B1 * | 3/2017 | Terrell | A01M 23/24 |
| 9,737,069 | B1 * | 8/2017 | Giles, Jr. | A01M 23/245 |
| 10,455,828 | B2 | 10/2019 | Jensen et al. | |
| 10,477,854 | B1 * | 11/2019 | Yang | A01M 23/245 |
| 10,524,464 | B1 * | 1/2020 | Cook | A01M 23/30 |
| 10,667,508 | B1 * | 6/2020 | Cook | A01M 23/30 |
| 10,765,106 | B2 * | 9/2020 | Crezee | A01M 31/002 |
| 11,006,623 | B1 * | 5/2021 | Walsh | A01M 23/00 |
| 11,033,018 | B2 * | 6/2021 | Laut | H01H 35/14 |
| 11,337,416 | B1 * | 5/2022 | Walsh | A01M 23/38 |
| 11,528,900 | B2 * | 12/2022 | Koziar, Jr. | G01V 3/02 |
| 11,564,386 | B2 * | 1/2023 | Vickery | A01M 25/004 |
| 2003/0110679 | A1 * | 6/2003 | Collins | A01M 23/36<br>43/81 |
| 2004/0020100 | A1 * | 2/2004 | O'Brien | A01M 31/002<br>43/1 |
| 2006/0272197 | A1 * | 12/2006 | Wiesener | A01M 23/30<br>43/81 |
| 2008/0204253 | A1 * | 8/2008 | Cottee | A01M 31/002<br>340/573.2 |
| 2009/0151221 | A1 * | 6/2009 | Daley | A01M 23/245<br>43/58 |
| 2010/0134301 | A1 * | 6/2010 | Borth | H04L 67/025<br>340/573.2 |
| 2011/0072709 | A1 * | 3/2011 | Patterson | A01M 23/30<br>43/131 |
| 2011/0083358 | A1 * | 4/2011 | Slotnick | A01M 31/002<br>43/81 |
| 2014/0085100 | A1 * | 3/2014 | Rich | H04L 67/125<br>340/870.01 |
| 2014/0300477 | A1 * | 10/2014 | Rich | A01M 23/00<br>340/573.2 |
| 2017/0215407 | A1 * | 8/2017 | Pinzone | A01M 23/16 |
| 2017/0238525 | A1 * | 8/2017 | Derman | A01M 23/30 |
| 2017/0354139 | A1 * | 12/2017 | Vickery | A01M 25/004 |
| 2018/0084773 | A1 * | 3/2018 | Aldo | A01M 23/12 |
| 2018/0110214 | A1 * | 4/2018 | McGrade | A01M 23/24 |
| 2018/0125056 | A1 * | 5/2018 | Hetman | A01M 23/245 |
| 2018/0132474 | A1 * | 5/2018 | Webster | A01M 23/245 |
| 2018/0199565 | A1 * | 7/2018 | Zosimadis | A01M 1/026 |
| 2018/0228139 | A1 * | 8/2018 | Bougie | A01M 29/30 |
| 2018/0235205 | A1 * | 8/2018 | Howard | A01M 1/026 |
| 2018/0271083 | A1 * | 9/2018 | Crezee | A01M 23/30 |
| 2018/0312317 | A1 * | 11/2018 | Petrous | A01M 23/30 |
| 2018/0317476 | A1 * | 11/2018 | Jones | A01M 23/245 |
| 2018/0325095 | A1 * | 11/2018 | Vickery | A01M 23/30 |
| 2018/0334289 | A1 * | 11/2018 | Ardron | A01M 23/30 |
| 2018/0334290 | A1 * | 11/2018 | Ardron | A01M 23/30 |
| 2019/0037829 | A1 * | 2/2019 | Laut | G01R 33/07 |
| 2019/0150425 | A1 * | 5/2019 | LaRoque | A01M 23/245 |
| 2019/0216076 | A1 * | 7/2019 | Rich | G08B 25/10 |
| 2019/0223430 | A1 * | 7/2019 | Theriault | A01M 23/16 |
| 2019/0327955 | A1 * | 10/2019 | Walsh | A01M 23/30 |
| 2019/0343108 | A1 * | 11/2019 | Theriault | A01M 23/30 |
| 2019/0350186 | A1 * | 11/2019 | Drake | A01M 1/026 |
| 2020/0029550 | A1 * | 1/2020 | Koziar, Jr. | H01Q 1/38 |
| 2020/0120919 | A1 * | 4/2020 | Dolshun | A01M 23/005 |
| 2020/0146277 | A1 | 5/2020 | Pinzone et al. | |
| 2020/0315156 | A1 * | 10/2020 | Giacia | A01M 23/16 |
| 2020/0329691 | A1 * | 10/2020 | Chessum | A01M 23/18 |
| 2020/0329692 | A1 * | 10/2020 | Dolshun | A01M 25/002 |
| 2020/0390082 | A1 * | 12/2020 | Waiker | A01M 23/245 |
| 2021/0022333 | A1 * | 1/2021 | Vickery | A01M 31/002 |
| 2021/0092946 | A1 * | 4/2021 | Blair | A01M 23/30 |
| 2022/0295778 | A1 * | 9/2022 | Holst-Pedersen | A01M 23/30 |
| 2024/0000061 | A1 * | 1/2024 | Walstad | A01M 23/26 |
| 2024/0130354 | A1 * | 4/2024 | Vickery | A01M 23/30 |
| 2025/0057147 | A1 * | 2/2025 | Blair | A01M 23/245 |

FOREIGN PATENT DOCUMENTS

| | | | | |
|---|---|---|---|---|
| CN | 106922646 | A * | 7/2017 | A01M 23/24 |
| CN | 108522492 | A * | 9/2018 | A01M 23/24 |
| EP | 3298891 | A1 * | 3/2018 | A01M 23/30 |
| EP | 3351099 | A1 * | 7/2018 | A01M 23/30 |
| WO | WO 2007/026123 | A1 | 3/2007 | |
| WO | WO 2015/185063 | A1 | 12/2015 | |
| WO | WO 2017/011916 | A1 | 1/2017 | |
| WO | WO 2017/036480 | A1 | 3/2017 | |
| WO | WO 2017/149163 | A1 | 9/2017 | |
| WO | WO 2019/040648 | A1 | 2/2019 | |
| WO | WO-2020095032 | A1 * | 5/2020 | A01M 23/24 |

OTHER PUBLICATIONS

International-Type Searching Report (ITS 201) dated Jan. 22, 2020 (5 pages) from Priority Application PA 2019 70443.

International Search Report dated Sep. 20, 2020 (2 pages) from PCT Priority Application PCT/EP2020/067184.

International Preliminary Report on Patentability (PCT/IB/326 and PCT/IB/373) and Written Opinion (PCT/ISA/237) dated Jan. 11, 2022 (7 pages) from PCT Priority Application PCT/EP2020/067184.

Search Report dated Apr. 22, 2024 (2 pages) out of corresponding European Application No. EP 241 66016 A filed Jun. 19, 2020.

Snap-E Review, WildlifeRemoval.com. (Mar. 27, 2019), https://www.wildliferemoval.com/snap-e-review/ (Year: 2019).

* cited by examiner

RODENT TRAP

CROSS-REFERENCE TO RELATED APPLICATIONS

This application claims priority under 35 U.S.C. § 120 as a Continuation of U.S. patent application Ser. No. 17/624,407, filed Jan. 3, 2022, with priority to PCT/EP2020/067184 filed Jun. 19, 2020 and thereby to Danish Patent Application DK PA201970443, filed Jul. 5, 2019, each of which is incorporated herein by reference in its entirety.

TECHNICAL FIELD

The present invention relates to a trap for small animals, e.g. rats and mice, such as a spring-loaded strike trap and a notifying/monitoring network of such spring-loaded strike traps operatively connected.

BACKGROUND ART

Within the area of rat traps there are many examples of different kind of rat traps having different structures and functionality, such as spring-loaded strike or snap traps. One example of a rat trap unit is disclosed in U.S. Pat. No. 6,807,767 B1. This rat trap is spring biased and has a plurality of light sources acting together to detect the position of a small animal to be trapped.

Disadvantages of known spring-loaded strike rat traps, among others, are that they are difficult to handle and require cumbersome ways of handling and arming as they often are complex in structure as being made up of many cooperating parts, and therefore not able to accomplish a user-friendly flexibility and more usable applications, and are not reliable enough in regard of unwanted triggering.

SUMMARY

One object of the invention is to provide a spring-loaded strike trap, which solves or at least reduces one or more of above problems.

Another object is to provide a spring-loaded strike trap with a more versatile use/functionality than the basic pest killing by enabling monitoring and notifying the presence of excess water and/or sewage or the like liquid/fluid, e.g. during flooding and/or water/sewage leaks or the like when in use.

One or more of the above objects are achieved by means of a spring-loaded strike trap and/or one or more such spring-loaded strike traps being configured for operative connection and monitoring presence of excess water and/or sewage or the like liquid/fluid due to flooding and/or leaks, when in use in a network being configured for communicating/notifying the presence of the excess liquid via wires and/or wirelessly, as claimed in the associated in-dependent claims, preferred variants thereof being defined in associated dependent claims.

According to the invention at least one of the objects are achieved by a spring-loaded strike rat trap comprising at least one spring, a housing, at least one striker bar, at least one arming bar, at least one trigger plate, and at least one trigger, the spring being configured for biasing the bars to move from a first position, where the arming bar and the trigger plate is releasably held by the trigger and in contact with a ready indicator to indicate that the spring-loaded strike rat trap is charged, into at least one other position where the movement of the bars is stopped, after the spring-loaded strike rat trap is triggered releasing the bars, wherein the striker bar, when the spring-loaded strike rat trap is triggered releasing the striker bar, is either biased by the spring into contact with a firing indicator in a final and/or end position, if a rat or mouse is not hit, or biased into contact with a rat or mouse of a first and/or certain and/or predetermined size hitting and killing it in an intermediary position not in contact with any of the indicators, wherein, in the spring-loaded strike rodent trap, the trigger plate is configured for engaging the firing indicator to displace the firing indicator a distance, as measured in the direction of trigger plate movement, when a rat having a second size or being smaller than the first and/or certain and/or predetermined size is hit by the striker bar, away from its location when the striker bar is in its final and/or end position, towards another location where the firing indicator is not in contact with the striker bar.

Further objects and features of the present invention will appear from the following definitions of aspects/embodiments/examples of the invention together with its advantages.

According to an additional aspect, in the spring-loaded strike trap according to any of above and/or any or one or more of the below aspects, the firing indicator and/or the ready indicator is made of a flexible material and/or has a shape making it flexible for broader application and/or larger tolerances and/or are less sensitive for deformations and/or provide smoother movement/engagement. According to yet another aspect, in the spring-loaded strike trap according to any of above or any or one or more of the below aspects, the firing indicator and/or the ready indicator is a conductor/made of a conductive material for easy and quick signalling. According to another aspect, in the spring-loaded strike trap according to any of above and/or any or one or more of the below aspects, the striking bar, the arming bar and the trigger plate are configured for rotating/pivoting around the same axis for more distinct movement. According to a further aspect, in the spring-loaded strike trap according to any of above and/or any or one or more of the below aspects, the spring is configured for biasing the striking bar and the arming bar to rotate/pivot around the same axis, which axis the trigger plate is configured for pivoting around when triggered for securing repeatability of movement. In yet another aspect, in the spring-loaded strike trap according to any of above and/or any or one or more of the below aspects, the striking bar and the arming bar both are made of conductive material and are configured for being in conductive connection with the same rotary/pivot axis for secure signals. According to one aspect, the spring-loaded strike trap according to any of above and/or any or one or more of the below aspects, comprises an energiser configured for being in conductive connection with the same rotary/pivot axis as the striking bar and the arming bar for enhanced and more secure signalling with less noise and eliminated or at least very reduced risk of interrupted signals etc. According to another aspect, in the spring-loaded strike trap according to any of above and/or any or one or more of the below aspects, the spring, the striker bar, the arming bar, the trigger plate and the trigger are configured for being arranged on an upper side of a bottom plate for forming a detachable inner inset configured for being a separate/autonomous inner part or module of the rat trap housing when assembled therein enabling easy replacement of the inner inset in case of a damaged one or updating to a new version. According to yet another aspect, in the spring-loaded strike trap according to any of above and/or any or one or more of the below aspects, the bottom plate of the detachable inner inset has the upper side and a lower side and the trigger plate is configured for being movably and/or pivotally attached to the upper bottom plate side via a rotary/pivot axis extending substantially in parallel or in parallel with the extension plane of the bottom plate or its bottom plate side for easier access and replacement from above. According to still another aspect, in the spring-loaded strike trap according to any of above and/or any or one or more of the below aspects, the bottom plate of the detachable inner inset has a plate shape defined by its upper side and lower side and two long sides and two short sides, the upper side and lower side are configured for forming substantially parallel and opposite planes (or parallel and opposite planes) extending substantially perpendicular or perpendicular to the long and short sides, which long and short sides are configured for forming pairwise substantially parallel and opposite sides (or parallel and opposite sides) relative each other, and the ready indicator comprises a first end configured for being arranged at one of the short or long sides of the bottom plate for conductive connection with the arming bar when in its first position when the detachable inner inset is assembled as a removable inner part or module into the rat trap as charged to provide easier assembly and disassembly and access to the detachable inner inset. According to one more aspect, in the spring-loaded strike trap according to any of above and/or any or one or more of the below aspects, the ready indicator comprises a second end configured for being arranged at one of the other short or long sides of the bottom plate in conductive connection with the arming bar when the detachable inner inset is assembled as a removable inner part or inner module into the rat trap as charged for enhanced signalling. According to an additional aspect, in the spring-loaded strike trap according to any of above and/or any or one or more of the below aspects, the ready indicator and/or the firing indicator is/are configured for being arranged as a part of the detachable inner inset to enable a more compact and easily replaceable inner inset. According to an aspect, in the spring-loaded strike trap according to any of above and/or any or one or more of the below aspects, the rat trap housing comprises a detachable outer upper casing or covering and a detachable outer bottom casing, which are configured for mating by being removably docketed together when the rat trap is assembled and configured for disconnection when the rat trap is disassembled providing an easier access of/to and enhanced detachability/assembly of the rat trap including its modules. According to an aspect, the spring-loaded strike trap according to any of above and/or any or one or more of the below aspects further comprises a detachable inner insert, when assembled, which is configured for removably receiving the detachable inner inset when the rat trap is assembled, the detachable inner insert being configured for comprising a power source and/or a control unit that provide an easy access to detachable rat trap modules and/or autonomous functionality and/or easy upgrading of each insert, such as replacing an “old” control unit with a newer one and also enables easy replacement of a broken one instead of having to replace a whole rat trap. According to one aspect, in the spring-loaded strike trap according to any of above and/or any or one or more of the below aspects, a detachable inner insert is configured for removable connection/mating/docketing with the detachable outer bottom casing when the rat trap is assembled for easy and quick disassembly/assembly. According to one aspect, in the spring-loaded strike trap according to any of above and/or any or one or more of the below aspects, a detachable inner insert or one or more outer coverings is configured for removable and/or fixedly mating/docketing with the detachable outer bottom casing when the rodent trap is assembled. If the outer covering is removably attached to the detachable outer bottom casing, easy access to desired inner parts, e.g. the electronics and/or striker unit of the trap is enabled. If the outer covering is fixedly attached to the detachable outer bottom casing, then the desired inner parts are covered, e.g. the electronics and/or striker unit of the trap is more securely and robust protected, also against moist or the like that may negatively affect the functionality/electronics of the trap.

According to one other aspect, in the spring-loaded strike trap according to any of above and/or any or one or more of the below aspects, the ready indicator and/or the firing indicator is configured for being arranged as a part of the detachable inner insert for easy access as separated from the inner inset. According to one aspect, in the spring-loaded strike trap according to any of above and/or any or one or more of the below aspects, the ready indicator is configured for being arranged as a part of the detachable inner insert or the inner inset. According to an aspect, in the spring-loaded strike trap according to any of above and/or any or one or more of the below aspects, the firing indicator is configured for being arranged as a part of the detachable inner insert or the inner inset.

According to one aspect, the spring-loaded strike trap according to any of above and/or any or one or more of the below aspects further comprises an outer covering, when assembled, which is configured for at least removably or fixedly cover the detachable inner inset when the rodent trap is assembled, and/or a power source and/or an internal trap controller and/or a radio transmitter or the like. According to one aspect, the spring-loaded strike trap according to any of above and/or any or one or more of the below aspects, comprises a housing made up of at least three parts, i.e. one or more outer coverings and a detachable bottom casing in which the inner inset for killing/catching rodents in turn is exchangeably assembled.

According to an additional aspect, in the spring-loaded strike trap according to any of above and/or any or one or more of the below aspects, the ready indicator and the firing indicator are elongated and configured for extending from their first ends at a position arranged on/at or above a first level defined as extending along the plane of the upper bottom plate side, towards the lower plate side and along this lower plate side at a second level defined as extending along the lower plate side towards and ending at their second ends for providing a more compact and space efficient design while securing good contact. According to yet another aspect, in the spring-loaded strike trap according to any of above and/or any or one or more of the below aspects, the energiser is elongated and configured for extending from a first end at a position arranged on/at or above the first level of the upper bottom plate side, towards the lower plate side and along this lower plate side at the second level of the lower plate side towards and ending at a second end for providing a more compact and space efficient design while securing good contact and an easy access of the ends of the ready indicator, firing indicator and energiser both at assembly but also at disassembly. According to still another aspect, in the spring-loaded strike trap according to any of above and/or any or one or more of the below aspects, the energiser is configured for being arranged at the pivot axis in conductive connection with the arming bar when the trap is charged and in conductive connection with a power source and/or a control unit when the detachable inner inset is assembled as a removable inner part or inner module into the trap and configured for being in conductive connection with the striker bar when the trap is triggered and the striker bar has been released and come into conductive contact with the firing indicator and configured for being in conductive connection with the ready indicator and the firing indicator when water or the like conductive fluid has reached the second level to enhance and secure the signalling path and the reliability of the signalling. According to one aspect, the spring-loaded strike trap according to any of above and/or any or one or more of the below aspects, comprises a movement and/or presence sensor for detecting an event in the rodent trap for pest control and for emitting a sensor signal in response to the event for direct communication with other rodent traps and/or directly with a data base and/or directly to or via a central/internal control unit to one or more other rodent traps and/or data bases, which movement and/or presence sensor in another aspect is a so-called passive infrared, PIR, sensor.

Further objects and features of the present invention will appear from the following definitions of aspects of the invention.

According to the invention at least one of the objects are achieved by a system or network of at least two spring-loaded strike traps according to any preceding and/or any or one or more of the below aspects, wherein these at least two rodent traps are operatively connected to cooperate for eliminating or at least reducing or at least minimising a population of rats and/or mice, wherein these at least two traps are configured to form a MESH network in which at least one and/or each and/or all rat traps continuously monitor presence of water or the like conductive fluid and that one or more of the rat traps is configured for registering if existing water or the like conductive fluid are at/over a certain/predetermined level by use of indicators that are conductively connected forming a closed circuit when the water or the like conductive fluid has reached the certain/predetermined level. Hence, no additional or external or separate sensors or detectors for monitoring leakage of water or the like conductive fluid are needed in for example a house and/or skyscraper.

According to another aspect, in the system/network of spring-loaded strike traps according to any of above and/or any or one or more of the below aspects, one or more of the rat traps configured for registering if existing water or the like conductive fluid are at/over a certain and/or predetermined level is operatively connected to a central unit, whereby the registering of the closing of the circuit of the indicators when the water or the like conductive fluid has reached the predetermined level is configured for triggering an alert signal indicating excess water and/or conductive fluid that is sent to one or more of the other rat traps and/or to the central unit that monitors all the rat traps and their functionality, wherein the central unit is configured for notifying associated personnel of water/sewage leakage or the like. Hence, no additional or external or separate sensors or detectors forming a network for monitoring leakage of water or the like conductive fluid are needed in for example a house and/or skyscraper.

One advantage of such a spring-loaded strike trap and/or system/network of spring-loaded strike traps is that it/they defines a failsafe mouse/rat trap in regard of faulty triggering by enabling monitoring and confirming if a small or very small rat/mouse is hit or not after triggering by means of one or more indicators being activated or not.

Another advantage of such a spring-loaded strike trap and/or system/network of spring-loaded strike traps above and below is that it/they is/are configured for checking the presence of excess water or the like conductive fluid by using one or more of the same indicators as in any of the aspects and advantages above and below requiring no additional or external or separate sensors or detectors for monitoring leakage of water or the like conductive fluid where the inventive rat traps is/are placed.

A further advantage of a spring-loaded strike trap and/or system/network of spring-loaded strike traps above and below is to provide a failsafe triggering in that the spring-loaded strike trap comprises a trigger plate that is configured for securing that the spring-loaded strike trap does not indicate that there is no pest/rodent killed or trapped when triggered, i.e. indicating a fault triggering, even though there is a small pest/rodent/mouse/rat killed or trapped, e.g. if a small mouse is trapped/killed but its body is flattened out such that the indicator of fault triggering (indicating a hit without hitting) would be activated even though it in fact is a "real" triggering, which error indication does not occur when using the inventive rat trap. This inventive trap is particular advantageous for catching small rodents, in particular mice.

Further objects and features of the present invention will appear from the following definitions of aspects/examples thereof.

BRIEF DESCRIPTION OF THE DRAWINGS

The invention will be described in more detail with reference to the enclosed figures, which show examples of presently preferred embodiments of the invention.

FIG. 2A is a view in perspective of the inner modular pest killing unit, FIG. 2B is a plane view from above of the inner pest killing unit of FIG. 2A, and FIG. 2C is a perspective view of the inner modular pest killing unit of FIGS. 2A and 2B but from another angle, i.e. from below, according to an aspect of the invention.

FIGS. 2AA to 2CC are three different views of a detachable inner part or module configured for being a removable inner component of the spring-loaded strike trap in FIGS. 1, 1A, this inner module of FIGS. 2AA to 2CC forms the actual pest killing unit of the trap, where FIG. 2AA is a view in perspective of the inner modular pest killing unit, FIG. 2BB is a plane view from above of the inner pest killing unit of FIG. 2AA, and FIG. 2CC is a perspective view of the inner modular pest killing unit of FIGS. 2AA and 2BB but from another angle, i.e. from below, according to an aspect of the invention.

FIG. 8A shows a section along line C-C on FIGS. 2B and 2BB, FIG. 8B shows a section along line B-B on FIG. 2B, and FIG. 8C shows a section along line A-A on FIGS. 2B and 2BB.

FIG. 8BB show a different plane view in section along line B-B of FIG. 2BB from the side of the inner modular pest killing unit of the spring-loaded strike trap according to FIGS. 1 to 5C, 7A and 7B, i.e. FIG. 8A shows a section along line C-C on FIGS. 2B and 2BB and FIG. 8C shows a section along line A-A on FIGS. 2B and 2BB that correspond to all aspects of FIGS. 2A to 2C, 2AA to 2CC, 3, 4, 4A, and 5 to 5C.

DETAILED DESCRIPTION

Figure 1:
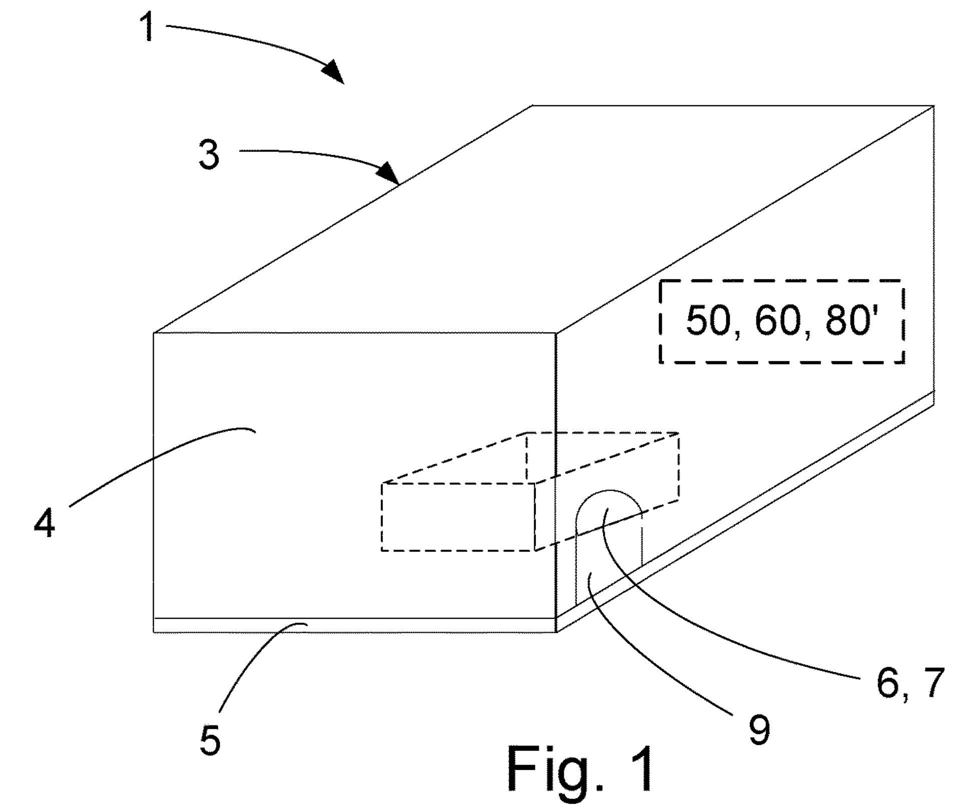
FIG. 1 is a perspective view of a spring-loaded strike animal trap according to an aspect of the invention.

A rodent trap 1 comprising one or more indicators 100, 101, 110, 120 is shown in FIGS. 1 to 9 as examples according to the invention (where the term rodent is not limiting, but as noted in the background, the trap is for small animals). The trap 1 is a spring-loaded strike trap comprising at least one beater/striker arm/bar 10 and an arming bar 20. The striker bar 10 is configured for a quick, clean and humane killing of small animals, such as a mouse and/or rat 200. The trap 1 also comprises a trigger plate 30. In the upper right part view on FIG. 7A, a prior art scenario of a killing of a small rat or mouse by means of a prior art rat trap is shown, where the rat/mouse is crushed and flatten to such an extent that an indication of a faulty triggering of the prior art trap occurs (definition of a faulty triggering is that the trap has released the striking bar 10 without there being any rat or mouse triggering it) even though there is in fact physically a small and flattened rat/mouse killed. The other larger lower view in FIG. 7A shows another scenario when using the present rat trap 1 where any faulty triggering is eliminated by means of the trigger plate 30 being configured for pushing and displacing an firing indicator 110 a certain or sufficient distance D out of contact with the striker bar 10 away from the prior art position in the upper right part view when the rat/mouse is pressed down by the striker bar 10 to avoid the faulty triggering as in the prior art rat trap, whereby the crushing and flattening of a small rat/mouse 200 in the present trap 1 does not incur a faulty triggering indication, i.e. trigger plate 30 is configured such that wherever any flattened rat/mouse 200 presses down on the trigger plate, the striker bar 10 does not come into contact with the firing indicator 110 and no faulty triggering indication occurs. The trap 1 comprises at least one spring 2 configured for biasing/moving the striker bar 10 with a killing force when released due to triggering of the trap.

Figure 1A:
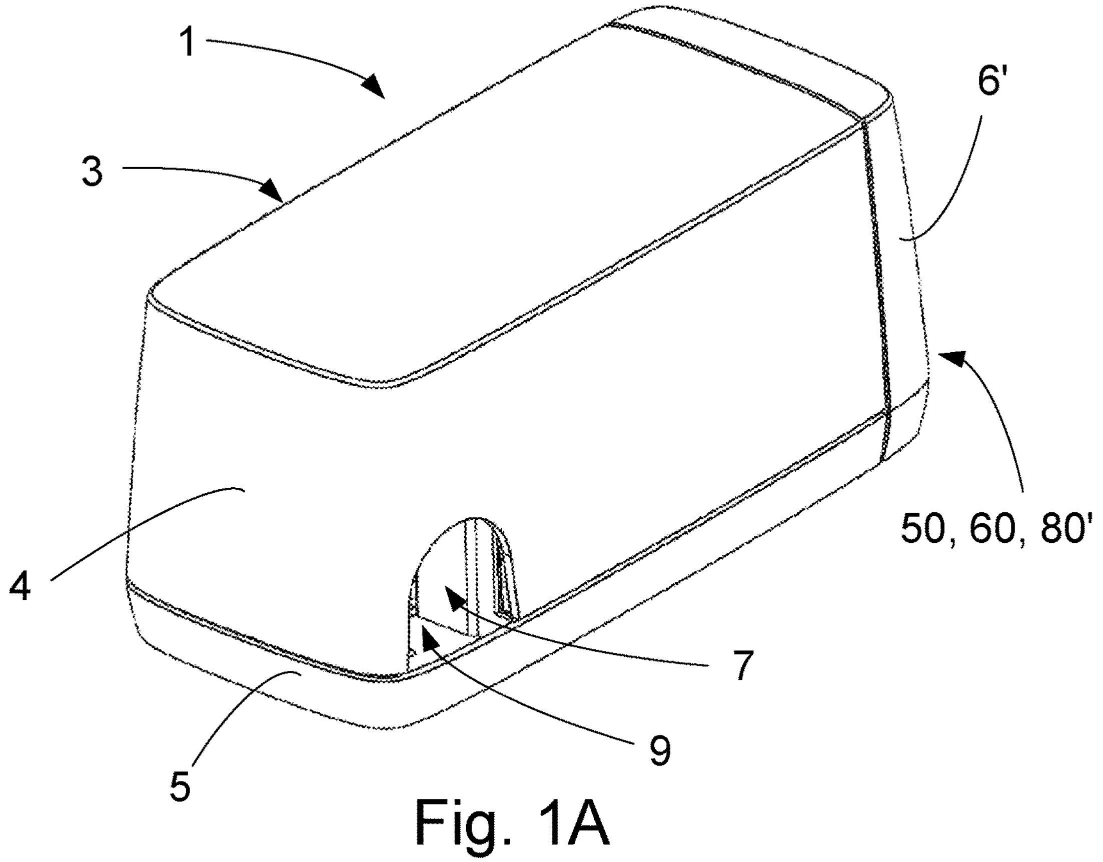
FIG. 1A is a perspective view of a spring-loaded strike trap according to an aspect of the invention.

The rodent trap 1 comprises a housing 3, see FIGS. 1 and 1A showing two aspects. The trap 1 is a modular system made up of separate detachable modules 4 to 7 as shown in FIGS. 3 to 5C. A module is configured to removably or fixedly mate with one or more of the other modules and functionally cooperate after all modules 4 to 7 are assembled together as the whole covering 3 making up the trap 1. Preferably, at least three of the modules, i.e. at least one removable upper part and/or outer upper casing/covering 4; at least one detachable outer bottom casing 5 and at least one inner inset 7 of FIGS. 1A, 4A, and 5A to 5C are configured to removably and/or exchangeably mate with one or more of the other modules, e.g. outer covering 6'.

Figure 2A:
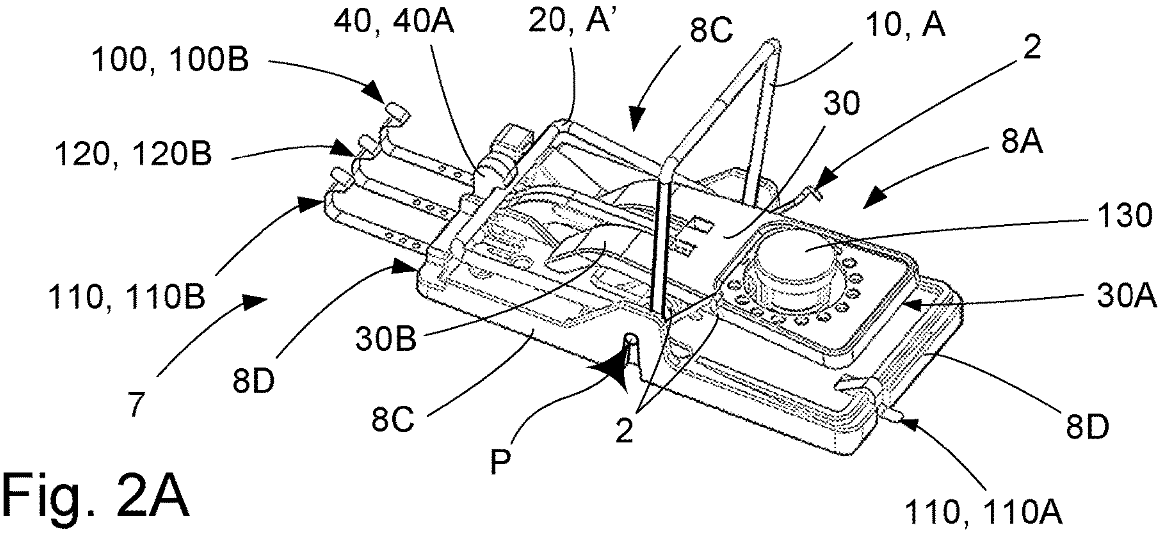
FIGS. 2A to 2C are three different views of a detachable inner part or module configured for being a removable inner component of the spring-loaded strike trap in FIG. 1, this inner module of FIGS. 2A to 2C forms the actual pest killing unit of the trap, where
Figure 2B:
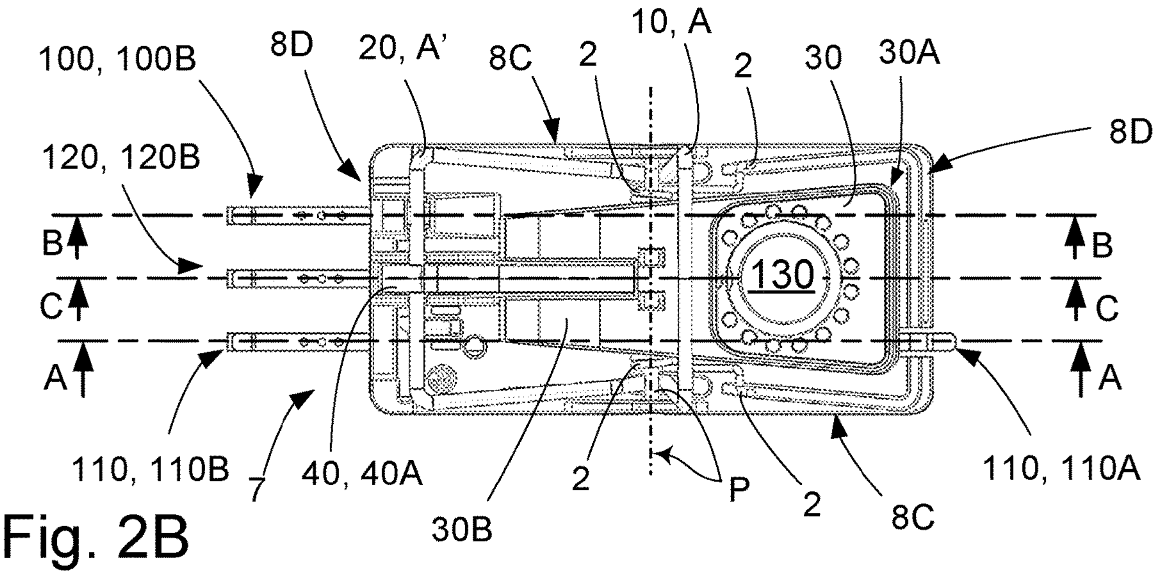
Figure 2C:
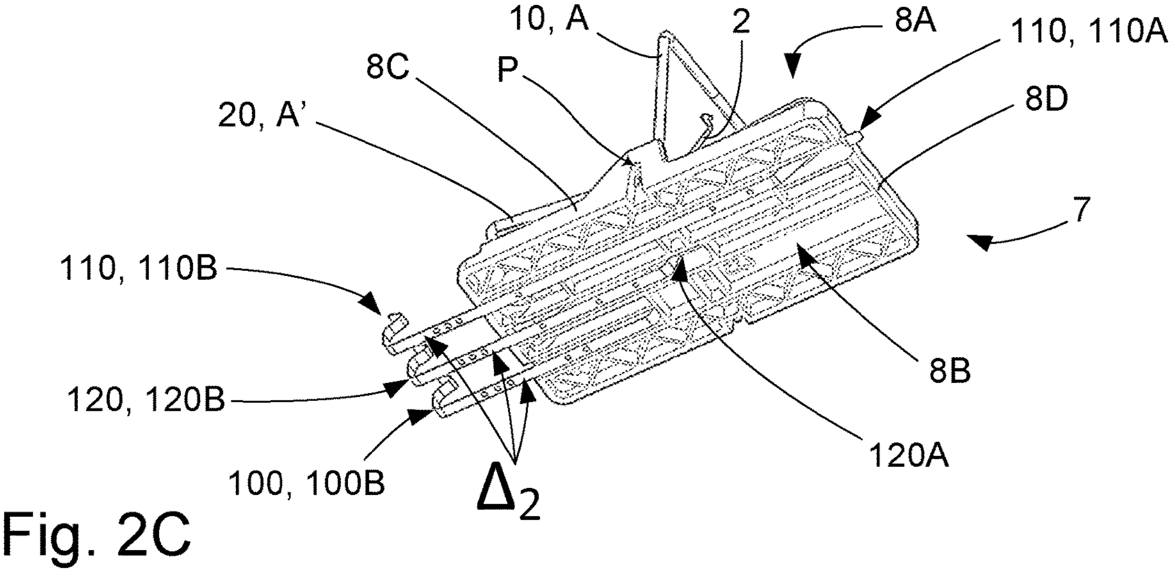
Figure 2A:
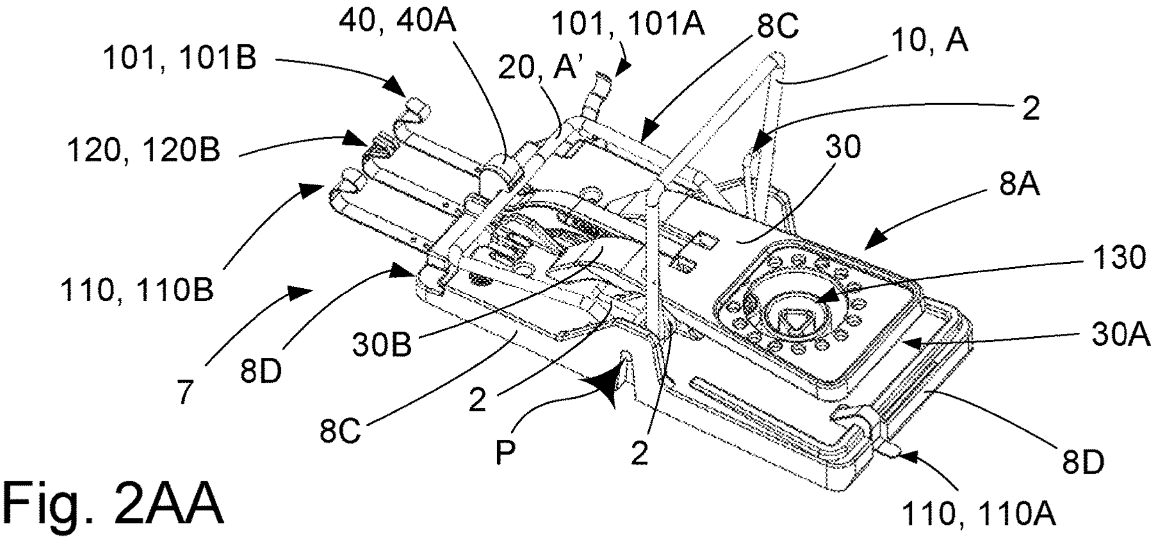
Figure 2B:
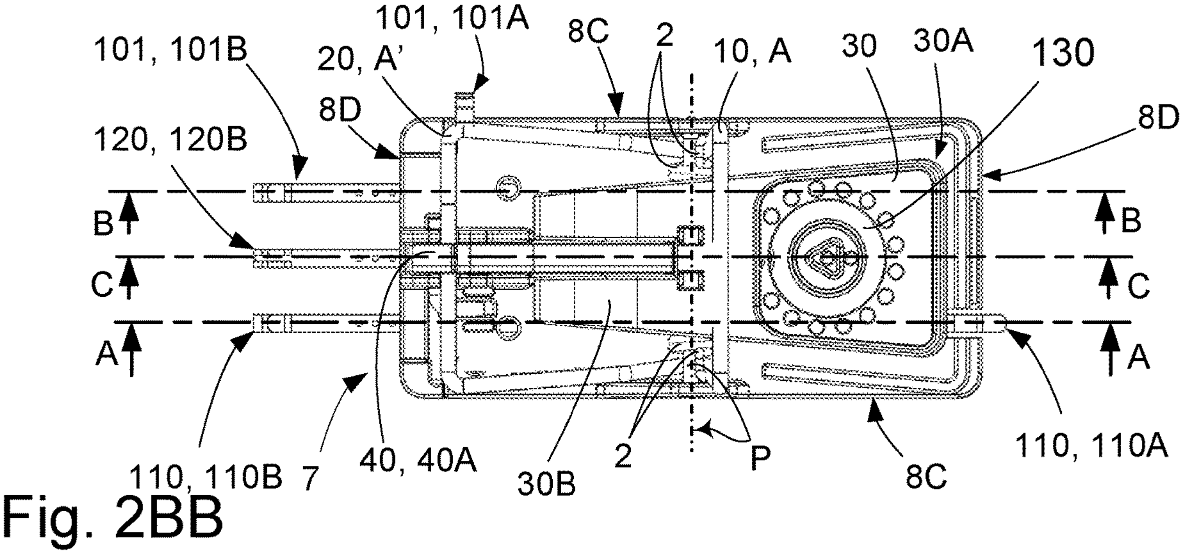
Figure 2C:
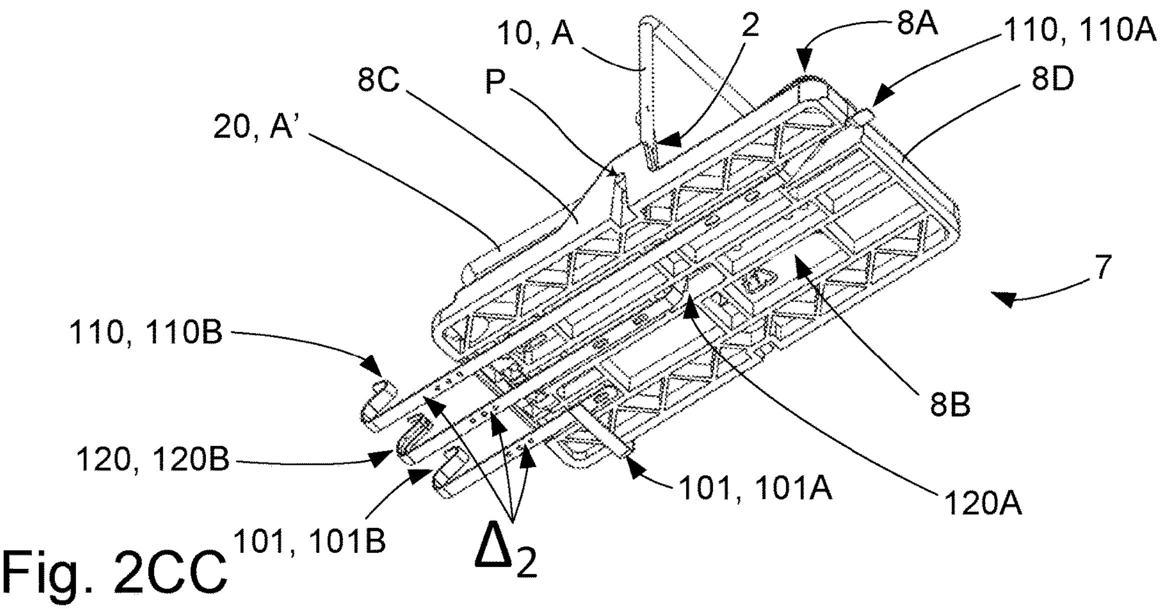
Figure 3:
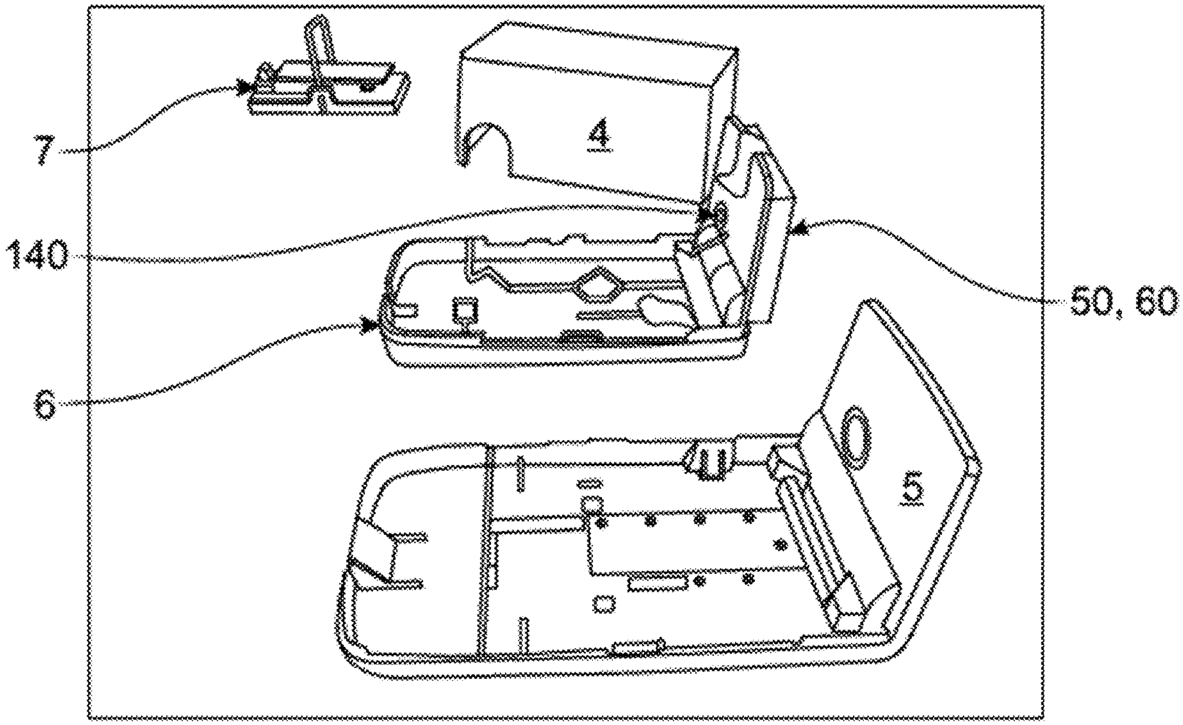
FIG. 3 shows in perspective an exploded view of one embodiment of the spring-loaded strike trap and its modules making it up of FIGS. 1 to 2C before or during detachable assembly of its separate parts or modules.
Figure 4:
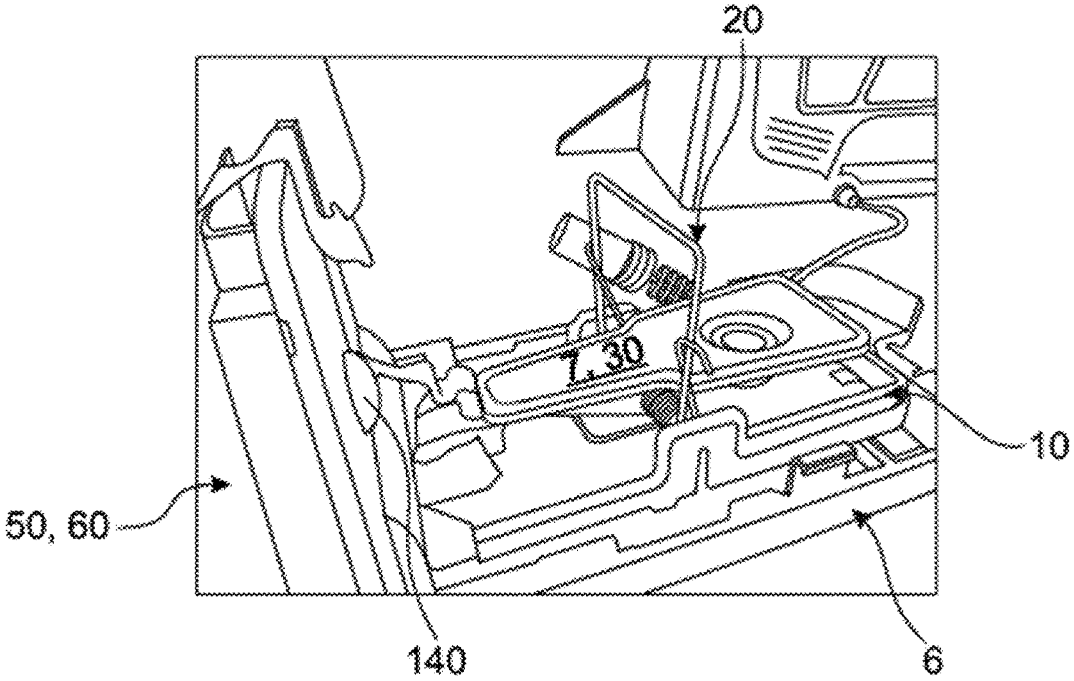
FIG. 4 shows in perspective two of the inner modules of FIG. 3 during detachable assembly or disassembly of these two of its inner separate detachable parts or modules according to an aspect of the invention after triggering.
Figure 4A:
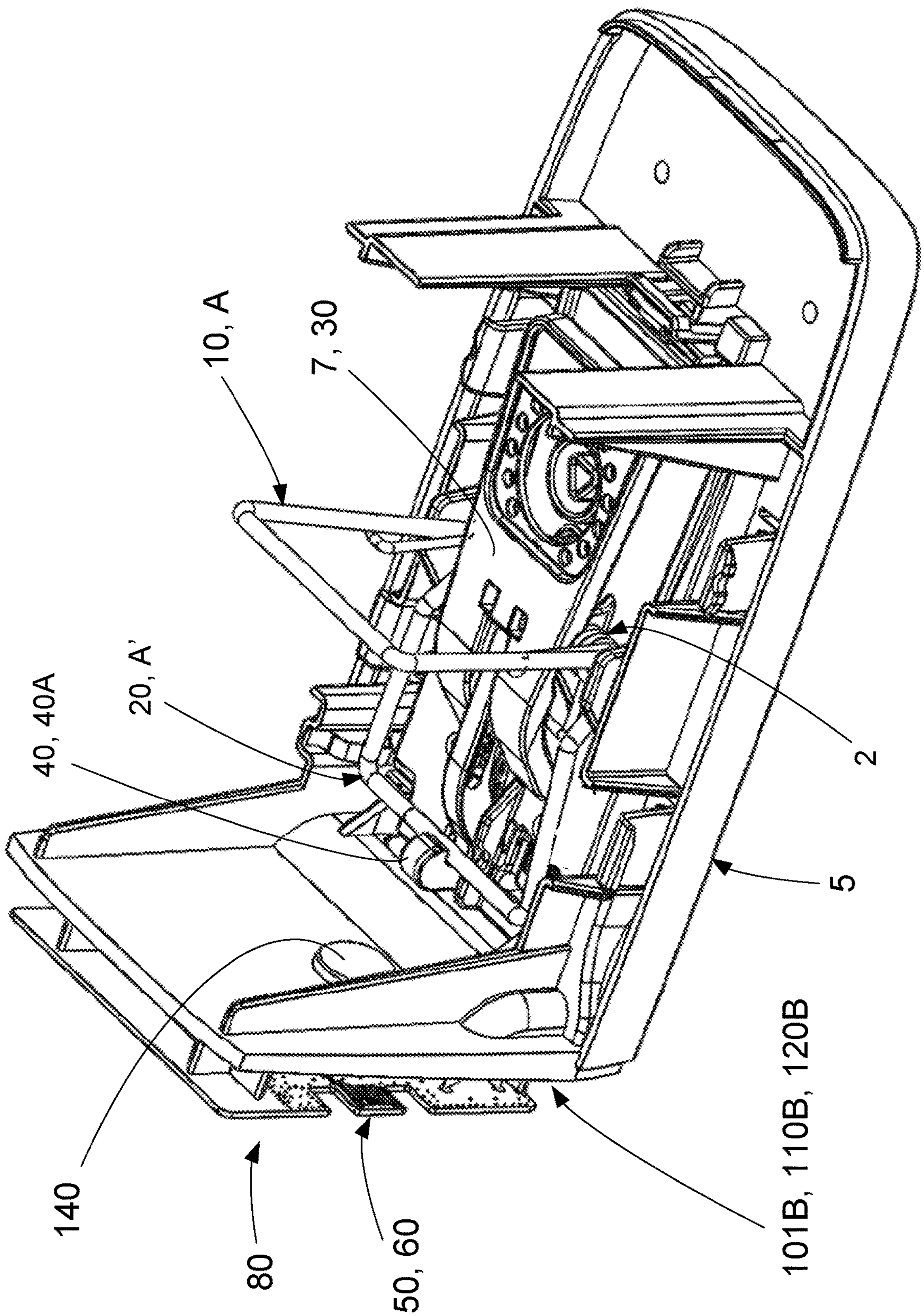
FIG. 4A shows in perspective modules similar to the ones of FIGS. 2AA to 2CC and 4, i.e. in another aspect, during detachable assembly or disassembly of these separate detachable parts or modules of the invention before triggering, i.e. when armed.
Figure 5:
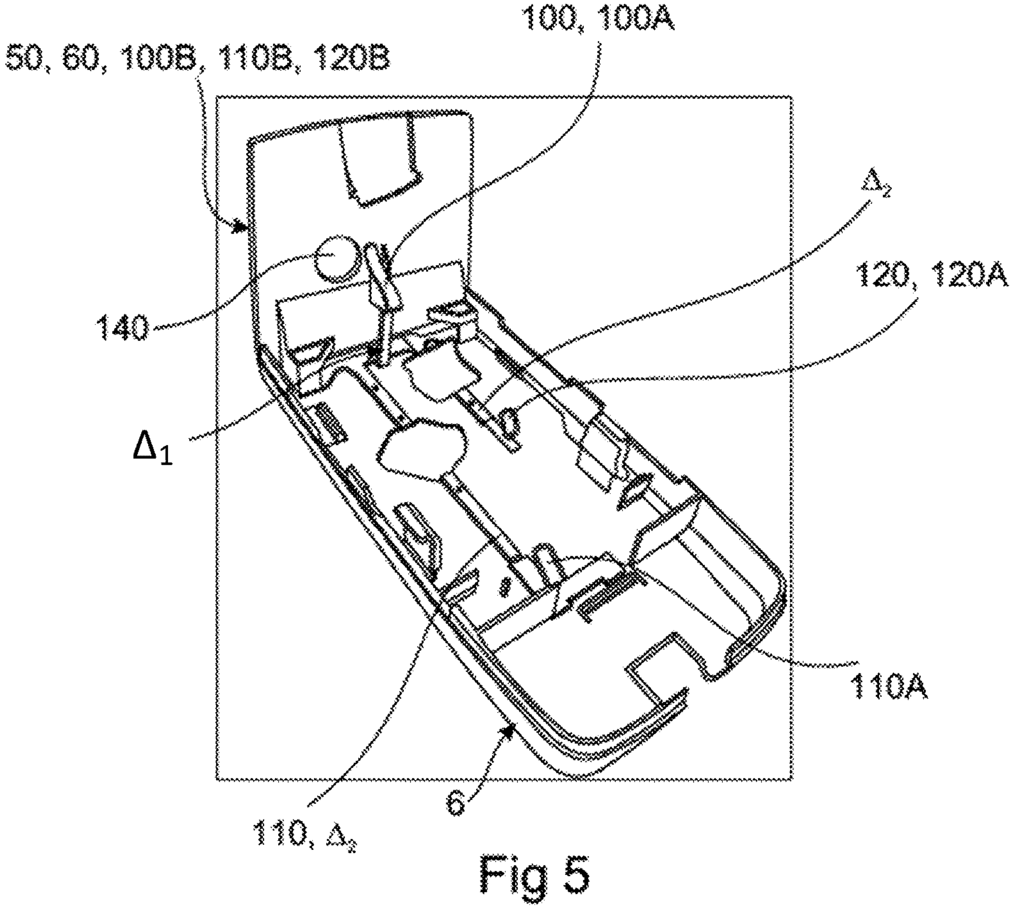
FIG. 5 shows in perspective the lower/larger detachable part/module of FIG. 4 separately before the other inner part/module is assembled therein or after it is disassembled therefrom.

The trap housing 3 comprises a first module being a removable upper part and/or outer upper casing/covering 4, see FIGS. 1, 1A, and 3. The trap housing 3 comprises a second module being at least one detachable outer bottom casing 5, see FIGS. 1, 1A, 3, 4A, 5A, 5B and 5C. The trap housing 3 comprises a third module being at least one detachable inner insert 6 see the aspect of FIGS. 1, 3 and 5. The trap housing 3 comprises a third module being at least one detachable or fixated outer covering 6', see the aspect of FIGS. 1A and 5C. The trap housing 3 comprises a fourth module being at least one detachable inner inset 7 comprising the spring 2 and striker bar 10, see FIGS. 2A-2CC, 4, 5C and 6. This inset 7 is the actual trap or killing unit of the striker trap 1. Modules 4, 5, 6 and 7 are each configured for detachable connection in a way similar to a Matryoshka/Babushka doll making the trap 1 possible to easily and quickly disassemble and assemble in the aspect of FIGS. 1, 3 and 5. In some aspects, the outer covering module 6' is also detachable in the same way or fixedly attached to the mouse/rat trap 1. This enhances and improves access to any module 4 to 7 achieving a very simple and effortless exchangeability of any or one or more of these modules, e.g. if broken, and/or creates an easy upgrading ability, e.g. to exchange a present spring 2 to a stronger/stiffer or more pliable spring 2 of the inset 7 and/or exchanging the whole present inner insert 6 or the inner inset 7 or both the inner insert 6 and inset 7 and/or the outer covering module 6' to future upgraded versions, e.g. with upgraded electronics or the like by enabling easy access to the electronics 50, 60 of the trap 1. The detachable inner insert 6 is configured for detachably fitting into the detachable outer bottom casing 5. The detachable inner inset 7 is configured for detachably fitting into the detachable inner insert 6 in the aspect of FIGS. 1, 3, 4, and 5. The detachable inner inset 7 is configured for detachably fitting into the detachable outer bottom casing 5 in the aspect of FIGS. 1A, 2A-2CC, 4A, and 5A-5C. The upper part and/or outer upper casing/covering 4 is configured, together with the detachable outer bottom casing 5, for detachably fitting over or enclosing at least the detachable inner insert 6 and the detachable inner inset 7 when assembling the rat trap 1 of FIGS. 1, 3, 4, and 5. The detachable inner insert 6 of the aspect in FIGS. 1, 3, 4, and 5 comprises one or more power sources 50, such as a battery, and one or more transmitters 60 for direct communication with other rat traps 1 having transmitting means and/or directly with a data base 70 and/or directly or via a central unit 80 and/or an internal controller 80' of the electronics and functions of one or mouse/rat traps 1 to one or more other rat traps and/or data bases 70 and/or other means for communication, see FIGS. 1, 3, 4, 5 and 9. The communication is achieved via wires or wirelessly between these entities 1, 60, 70, 80, 80'.

The upper part and/or outer upper casing/covering 4 is configured, together with the detachable outer bottom casing 5 and outer covering/end/side wall 6', for detachably fitting over or enclosing at least the detachable inner inset 7 when assembling the rat trap 1 of FIGS. 1A, 2A-2CC, 4A, and 5A-5C making up the whole cover/housing 3. The outer end covering 6' of the aspect in FIGS. 1A, 2A-2CC, 4A, and 5A-5C comprises one or more power sources 50, such as a battery, and one or more transmitters 60 for direct communication with other rat or mouse traps 1 having transmitting means and/or directly with a data base 70 and/or directly or via a central unit 80 and/or an internal controller 80' of the electronics and functions of one or mouse/rat traps 1 to one or more other mouse/rat traps and/or data bases 70 and/or other means for communication, see FIGS. 1A, 2A-2CC, 4A, and 5A-5C and 9. This communication is achieved via wires or wirelessly between these entities 1, 60, 70, 80, 80'.

In some embodiments, one or more of the rat traps 1 comprises a sensor 140 operatively connected to a controller 80' of the trap 1. This sensor 140 is in some aspects a movement and/or a presence sensor. This sensor 140 is e.g. a so-called passive infrared, PIR, sensor. The sensor 140 may also be a mechanically influenced contact/switch, a temperature sensor or another type of sensor. The sensor may emit an analog or digital signal directly to a controller 80' and/or the central unit 80 and/or to one or more rat traps 1, e.g. their controllers 80', and/or one or more data bases 70 and then indirectly to the central unit. The sensor 140 is powered in some aspects without being interrupted by the control unit 80' in order to thereby ensure detection of an event in the rat trap 1 when it occurs which, in some cases, may be a prerequisite for detection. In other aspects, the power supply to the sensor 140 is interrupted or reduced, optionally via a particular command to the sensor during those periods when the trap is in its sleep mode, e.g. to save/optimise current consumption for extending the battery power and/or battery life. The sensor 140 sends signals concerning if a rat or mouse 200 is moving/has been moving in the rat trap 1 to enable checking e.g. if bait must be added and/or changed and/or the rat trap must be emptied. In an aspect, the sensor 140 is a camera or the like or is used together with a camera, whereby image recognition of pictures and/or video is/are used for control of the trap 1 and/or check of presence of pests 200 by detection of them. In an aspect, the sensor 140 is a microphone or the like or a microphone is used together with the sensor 140 and/or a camera, whereby sound and/or image/video recognition is/are used for control of the trap 1 and/or check of presence of pests 200 by detection of them.

The rat trap 1 is a spring-loaded strike trap comprising the at least one spring 2 configured for biasing the striker bar 10 from a first start or armed position A to at least one other and/or intermediary/end/second position B, C. The rat trap 1 is a spring-loaded strike trap comprising the at least one other movable bar 20 configured for indicating/securing arming of the rat trap 1 by being configured for releasable attachment to a second start or armed position A'. The rat trap 1 is a spring-loaded strike trap comprising the spring 2 configured for biasing the movable arming bar 20 from its start position A' to at least one other and/or intermediary/second/end position B', C'. The start/armed positions A, A' for the striker bar 10 and the movable arming bar 20, respectively, are positions where the rat trap 1 is armed, i.e. the rat trap is not yet triggered. The other and/or intermediary/end/second positions B, B', C, C' for the striker bar 10 and movable arming bar 20, respectively, are positions where the rat trap 1 has been triggered by means of the trigger plate 30 and a trigger 40 or by other means/reasons and the bars 10, 20 have been released and moved or swiped or rotated or turned quickly from their respective start/armed positions A, A' into a physically other position B, B', C, C', respectively. This is common for all aspects.

The trigger 40 comprises a first or release end 40A configured for releasably holding the arming bar 20 and a second or anvil or holder end 40B for releasably holding the trigger plate 30. The trigger plate 30 comprises a first end 30A arranged at one end 8D of the bottom plate 8. The trigger plate 30 comprises a second end 30B adjacent the second trigger end 40B and configured to be releasably held/engaged by this trigger end 40B such that when the first trigger plate end 30A is pressed down, e.g. by a rodent 200, the other trigger plate end 30B is lifted and the second trigger end 40B is released and also the first trigger end 40A such that the engagement between the arming bar 20 and the first trigger end 40A is lost and the arming bar 20 together with the striker bar 10 is released. The first trigger end 40A is shaped similar to a hook that is hooked over the arming bar 20 in the armed position A'. The trigger 40 is configured to rotate or turn or pivot around an axis T, see FIG. 8A. This is common for all aspects.

The striker bar 10 and arming bar 20 follow each other movements when released. Each start position A, A' is an original/initial position for each bar 10, 20 while each end position B, B' for each bar is the final or stop position for each bar after triggering the rat trap 1, i.e. after the bars are released and then moved a maximum distance or angle as each bar is pivoted or rotated or turned into these final positions before being rearmed again. The intermediary positions C, C' for each bar 10, 20 are positions where the striker bar 10 has hit a rodent, e.g. a rat or mouse, and then been stopped in its movement at its intermediary position C before reaching its maximum or final or end position B. The same goes for the arming bar 20 stopping simultaneously in its intermediary position C' before reaching its maximum or final or end position B'. The arming bar 20 is usable as a handle configured for pushing the arming bar (and the striker bar 10 simultaneously) back in the opposite direction of its movement when released into their arming positions A, A' again and releasably locking the arming bar in place by means of the trigger 40 charging the rat trap 1. This is common for all aspects.

Figure 7A:
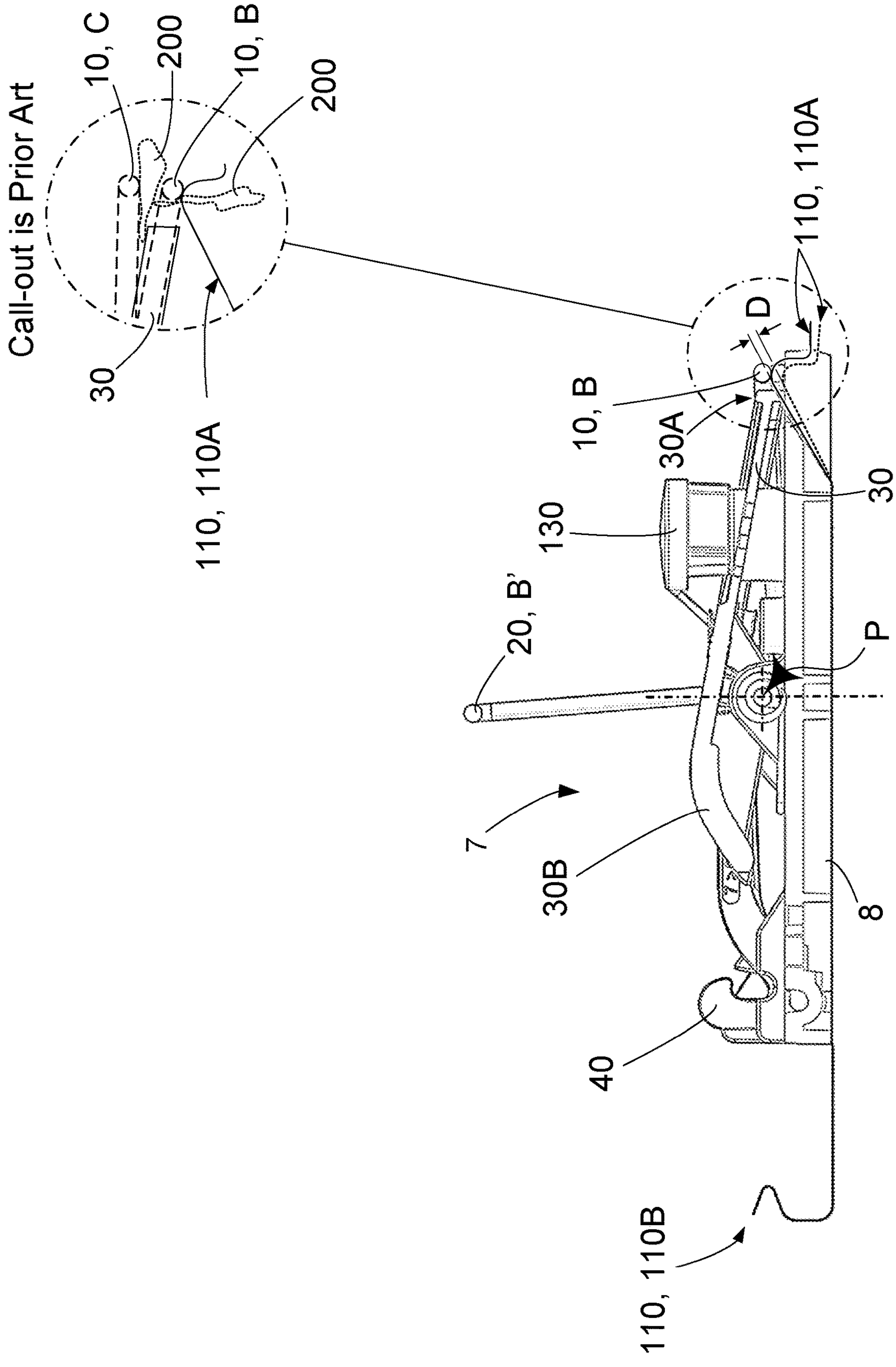
FIGS. 7A and 7B show plane views in section along the same line A-A of FIGS. 2B and 2BB from the side of the inner modular pest killing unit of the spring-loaded strike trap according to all aspects of FIGS. 1 to 5C.
Figure 7B:
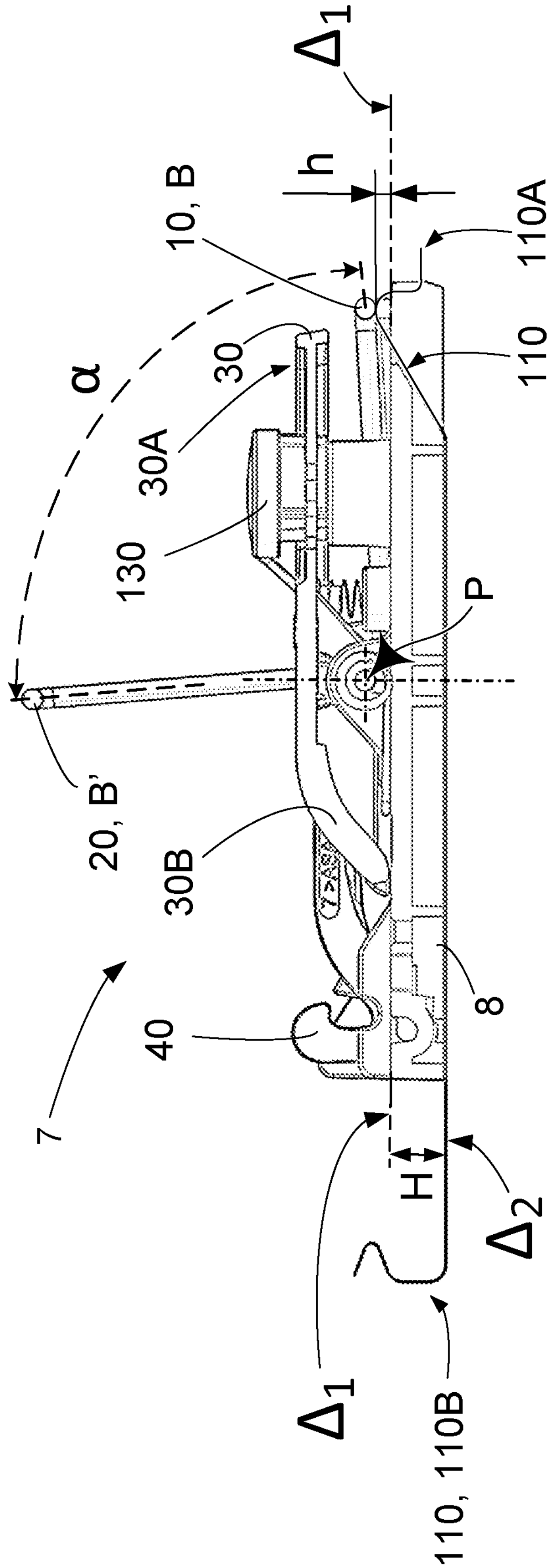

The striker bar 10 and arming bar 20 are configured for synchronised movements when released. The striker bar 10 and arming bar 20 is in an aspect different ends of the same metal bar. The striker bar 10 and arming bar 20 is in another aspect different ends of the same metal bar being shaped as a soccer goal. The metal bar is an elongated metal wire formed into a rectangular plane hollow shape and then formed/bent about an axis in parallel with the plane of the rectangular hollow shape. The striker bar 10 forms a U-shaped metal wire that transcends or extends into another U-shaped metal wire being the arming bar 20 with an angle $\alpha$ therebetween (FIG. 7B). The U-shaped striker bar 10 and the U-shaped arming bar 20 then extends from each other with the angle α between them being between about 80° to 120°. The angle α is in this case a bending angle but could be made by other methods than bending, e.g. making striker bar 10 a separate U-shaped bar and weld it at its ends, at an angle α, to the ends of the arming bar 20 being another separate U-shaped bar.

In the first/start/armed position A for the striker bar 10, the movable arming bar 20 is in contact with a first stop or end anvil or end/first indicator 100 in the aspect of FIGS. 1, 3, 4, and 5 or a first stop or end anvil or end/first indicator 101 in the aspect of FIGS. 1A, 2A-2CC, 4A, and 5A-5C with a purpose of indicating that the rat trap 1 is armed, i.e. that the rat trap is not yet triggered but ready for use. The only difference between the first indicator 100 of the former aspect above and the first indicator 101 of the latter aspect above is their orientation or position, i.e. they have both the same function. The former first indicator 100 is extending in full in parallel with the direction of movement of the striker bar 10 (and in parallel with the longitudinal directions of the other indicators 110 and 120, see below and FIGS. 2A to 2C) while the latter first indicator 101 is extending partly in parallel with the direction of movement of the striker bar 10 (and partly in parallel with the longitudinal directions of the other indicators 110 and 120, see below and FIGS. 2AA to 2CC) but has a first end or end part 101A that changes direction about or exactly 90°, i.e. this end 101A extends perpendicular into a free end adapted for contact with the arming bar 20 as for the former first indicator 100). The other position C for the striker bar 10 is a second position and/or an intermediary end position where the rat trap 1 has been triggered and the striker/killing bar 10 has been released and moved or swiped or rotated or turned quickly from its start position A into a physical other position C hitting a rat/mouse and killing it, thereby ending, i.e. being stopped in its movement against the body of the rat/mouse 200. The other and/or end/second position B is an end position where the rat trap 1 has been triggered and the striker bar 10 has been released and moved or swiped or rotated or turned quickly from the start position A into a physical other position B not hitting a rat/mouse and thereby not killing it and ending/being stopped in its movement at this physical other position B by mistake, i.e. unintentionally, e.g. due to an error. In this final or end/second position B, the striker bar 10 is in contact with a second stop or second end anvil or second end/second indicator 110 closing a circuit between the end indicator 110 of FIG. 8C and the third indicator 120 of FIG. 8A via killing bar 10 and spring 2 and connection P. In the intermediary or other position C for the striker bar 10, the striker bar is not in contact with any indicator. In the intermediary or other position C' for the arming bar 20, the arming bar is not in contact with any indicator. Each of these indicators 100, 101 and 110 are configured for closing an electric circuit with the third indicator 120 of FIG. 8A via spring 2 and connection P when the striker bar 10 and arming bar 20 comes into contact with its indicator in positions A' and B above and shown in FIGS. 2A to 2CC, 4, 4A, 5C, 6, 7A, 7B, 8A, 8B, 8BB and 8C.

The spring 2 of the mouse/rat trap 1 is a spring configured for primarily biasing/loading the strike bar 10, such that it is very swiftly swept/moved and hits the rat/mouse with enough force for a quick kill when the trap 1 is triggered. The spring 2 of the rat trap 1 comprises a first end 2A. The first spring end 2A is configured for being in conductive/electrical contact with a third indicator 120 shown in FIGS. 8A, this indicator 120 is the same for both aspects of FIGS. 1, 2A-2C, 3, 4, and 5, and 1A, 2A-2CC, 4A, and 5A-5C, respectively, the same goes for the second end/second indicator 110. The trap 1 is adapted for being placed adjacent or against or in contact with or at a distance from a vertical object, such as a wall or the like. The striker trap 1 is adapted for standing on a horizontal layer or surface or floor or the like. The trap 1 may be partly attached to the vertical wall/section and/or the horizontal layer/floor if an enhanced stability of the striker trap is desired, but such attachment is not necessary in all applications, i.e. the trap is able to be fully free-standing in a stable way.

The spring-loaded strike trap 1 comprises the at least one spring 2, the housing 3, the at least one striker bar 10, the at least one arming bar 20, the at least one trigger plate 30, and the at least one trigger 40. The arming bar 20 and the trigger plate 30 is releasably held by the trigger 40 (see FIGS. 2A to 2CC, and 8A to 8C/8BB) in the first positions A, A'. The arming bar 20 and the trigger plate 30 is releasably held by the trigger 40 in contact with the ready indicator 100, 101 in the first positions A, A' (see FIGS. 2A to 2CC and 8A to 8C/8BB). The ready indicator 100, 101 indicates that the spring-loaded strike trap 1 is armed/charged by closing a circuit formed between the ready indicators 100, 101 of FIGS. 8B and 8BB and the third indicator 120 via arming bar 20 and spring 2 and connection P. The spring 2 is configured for biasing the bars 10, 20 to move from their first positions A, A' into the at least one other position B, B', C, C', where the bar movements are stopped, when/after the spring-loaded strike trap 1 is triggered releasing the bars. The striker bar 10, when the spring-loaded strike 1 trap is triggered releasing the striker bar, is either (releasably) biased by the spring 2 into contact with the firing indicator 110 in the final/end position B, if a rat or mouse 200 is not hit, or biased into contact with a rat or mouse 200 of a first/certain/predetermined size hitting and killing it in the intermediary position C not in contact with any of the indicators 100, 101, 110, wherein no circuit between arming/striking bars 10, 20 and spring 2 and connection P and the third indicator 120 is closed indicating a "catch" of a rat or mouse 200.

The trap 1 and/or its components making it up can be made of non-wood related materials such as plastics, metal, e.g. aluminium etc. or a mixture of two or more of those materials as long as the parts for conductive/electrical connections provides reliable closing and opening of the electrical circuits as explained herein. The trap 1 and its parts 4 to 7 and 10 to 40 and 100 to 120 are made of recyclable materials. The spring 2; pivot axis P; striker bar 10; arming bar 20; ready indicators 100, 101; firing indicator 110 and the other/third indicator or energiser 120 are at least partly conductive and/or made of conductive material to enable closing and cutting electric circuits depending on their positions and to which entities they are in conductive connection. Preferably, the spring 2, the pivot axis P, striker bar 10, the arming bar 20, the ready indicator 100/101, the firing indicator 110 and the other/third indicator or energiser 120 are at least partly made of conductive metal.

The trigger plate 30 is configured for engaging the firing indicator 110 to displace the firing indicator a distance D (see FIG. 7A), as measured in the direction of trigger plate movement. This displacement D of the firing indicator 110, when a rat/mouse 200 having a second size/being smaller than the first/certain/predetermined size is hit by the striker bar 10, away from its location when the striker bar is in its final/end position B shown in upper right part view of FIG. 7A with the firing indicator 110 in solid lines in both this part view and the larger lower view of FIG. 7A, towards another location where the firing indicator is not in contact with the striker bar 10 as shown with the firing indicator 110 in dotted lines in the larger lower view of FIG. 7A similar to an intermediary position C for the striker bar 10. This function is common for all aspects.

The firing indicator 110 and/or the ready indicator 100/101 and/or the energiser 120 is/are made of a flexible material and/or has a shape making it flexible. Preferably, the firing indicator 110 and/or the ready indicator 100/101 and/or the energiser 120 is/are flat elongated metal strips as seen in FIGS. 2A, 2AA, 2C, 2CC, 3, 5, 5A to 5C, 6, 7A, 7B, 8A, 8B, 8BB, and 8C. This is common for all aspects.

The bottom plate 8 of the detachable inner inset 7 comprises an upper side 8A and lower side 8B. The trigger plate 30 is configured for being movably/pivotally attached to the upper bottom plate side 8A via the rotary/pivot axis P extending substantially in parallel or in parallel with the extension plane of the bottom plate or its bottom plate side. The bottom plate 8 of the detachable inner inset 7 has a plate shape defined by its upper side 8A and lower side 8B and two long sides 8C and two short sides 8D. The upper side 8A and lower side 8B are configured for forming substantially parallel and opposite planes extending substantially perpendicular to the long and short sides 8C, 8D. The long 8C and short 8D sides are configured for forming pairwise substantially parallel and opposite sides relative each other. The ready indicator 100/101 comprises a first end 100A/101A configured for being arranged at one of the short 8D or long 8C sides of the bottom plate 8 for conductive connection with the arming bar 20 when in its first position A' when the detachable inner inset 7 is assembled as a removable inner part or module into the trap 1. The ready indicator 100/101 comprises a second end 100B/101B configured for being arranged at one of the other short 8D or long 8C sides of the bottom plate 8 in conductive connection with the arming bar 20 when the detachable inner inset 7, i.e. the striking/killing unit, is assembled as a removable inner part or inner module into the trap 1 as charged. This is common for all aspects. The indicators 100, 101, 110 and 120 are in some aspects part of the inner inset 7. The indicators 100, 101, 110 and 120 are in some aspects part of the detachable outer bottom casing 5. The indicators 100, 101, 110 and 120 are in some aspects parts of the detachable outer bottom casing 5 and the inner inset 7. The second indicator ends 100B, 101B, 110B, 120B are introduced into the end with electronics 50, 60, 80' of the detachable outer bottom casing 5 as seen in FIGS. 4A, 5C, and 8A-8C/8BB to be in operational/electrical connection with the electronics when assembling the inset 7 therein.

The ready indicator 100/101 is configured for being arranged as a part of the detachable inner inset 7 (see FIGS. 2A-2C, 2AA-2CC, 7A-7B and 8A-8C/8BB) or the detachable inner insert 6 (see FIG. 5) and/or the detachable outer bottom casing 5, the same goes for the firing indicator 110 and the energiser 120.

The trigger plate 30 comprises a first end 30A adjacent the firing indicator 110 and a second end 30B at or closer to the ready indication 100/101. The second trigger plate end 30B has a shape such that its lower part is supported against the upper side 8A of the bottom plate 8 at a lower position than its first end 30A. The first trigger plate end 30A is a free end that can tilt downwards toward the firing indicator 110 when a rat/mouse 200 presses it down, but the other trigger plate end 30B hinders the first trigger plate end 30A from tilting upwards not more than into a horizontal position, i.e. the trigger plate 30 can tip its first end 30A below a horizontal level as seen in FIG. 7A but cannot tip its first end 30A upwards past or beyond the horizontal level as seen in FIGS. 4A, 5C, 6, 7B and 8A-8C/8BB as its second/other end 30B engages or abuts the upper side 8A of the bottom plate 8, at or close to adjacent a first level $\Delta_1$. The trigger plate 30 is kept horizontal by the trigger 40 and its second end 30B when no rat or mouse 200 presses it down and the trap 1 is charged, i.e. in its positions A, A' for the ready and firing indicators 100, 101, 110. This is common for all aspects.

Figure 8B:
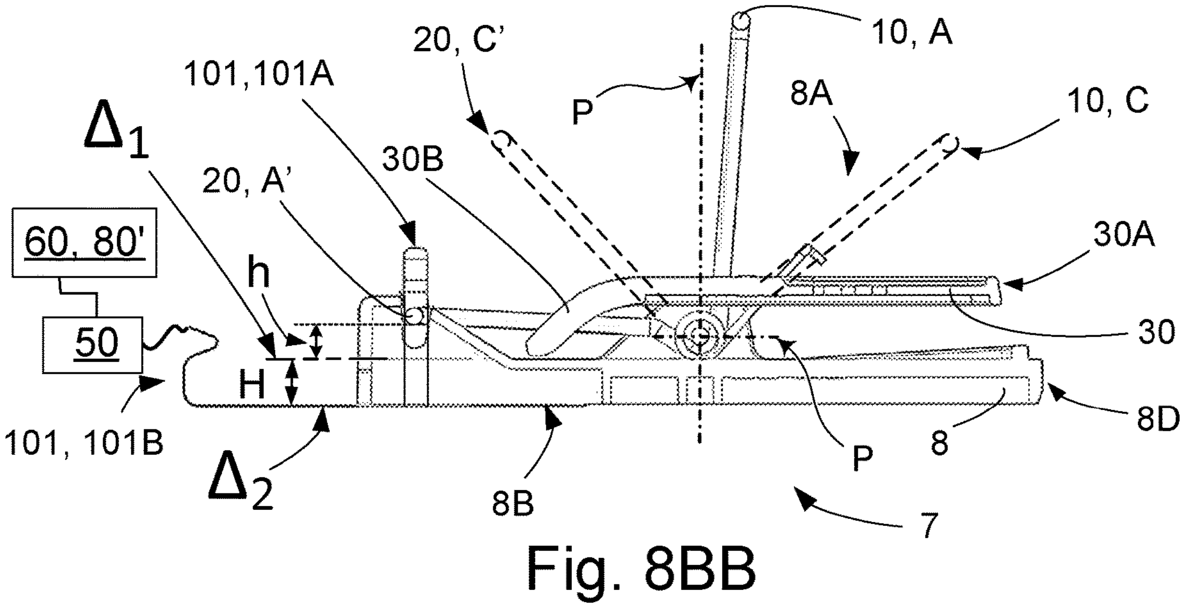
FIGS. 8A to 8C show three different plane views in section along different lines A-A, B-B and C-C of FIGS. 2B and 2BB from the side of the inner modular pest killing unit of the spring-loaded strike trap according to FIGS. 1 to 5C, 7A and 7B, i.e.
Figure 5A:
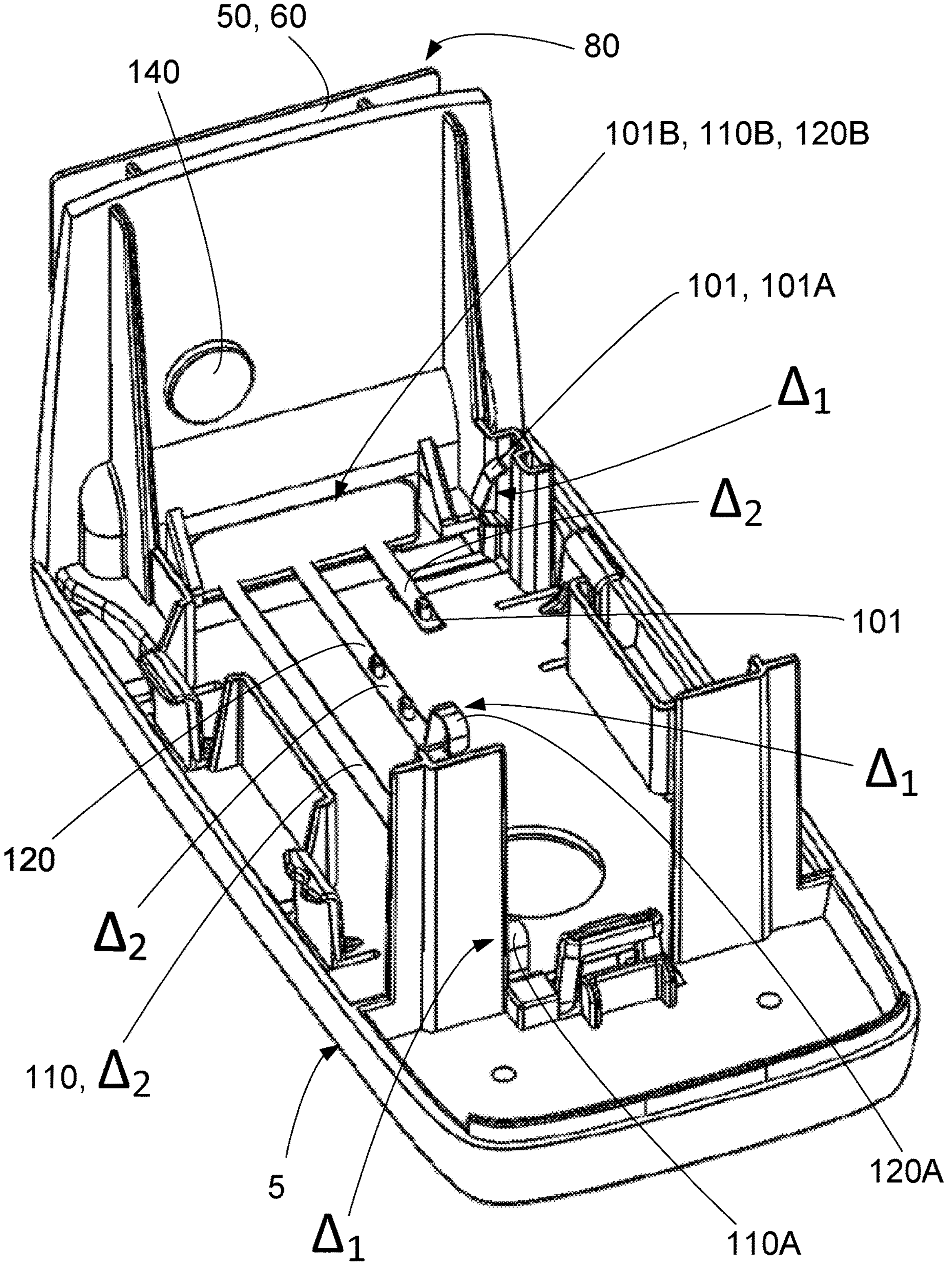
FIG. 5A shows in perspective the lower/larger detachable part/module of FIG. 4A separately before the other inner part/module is assembled therein or after it is disassembled therefrom.
Figure 5B:
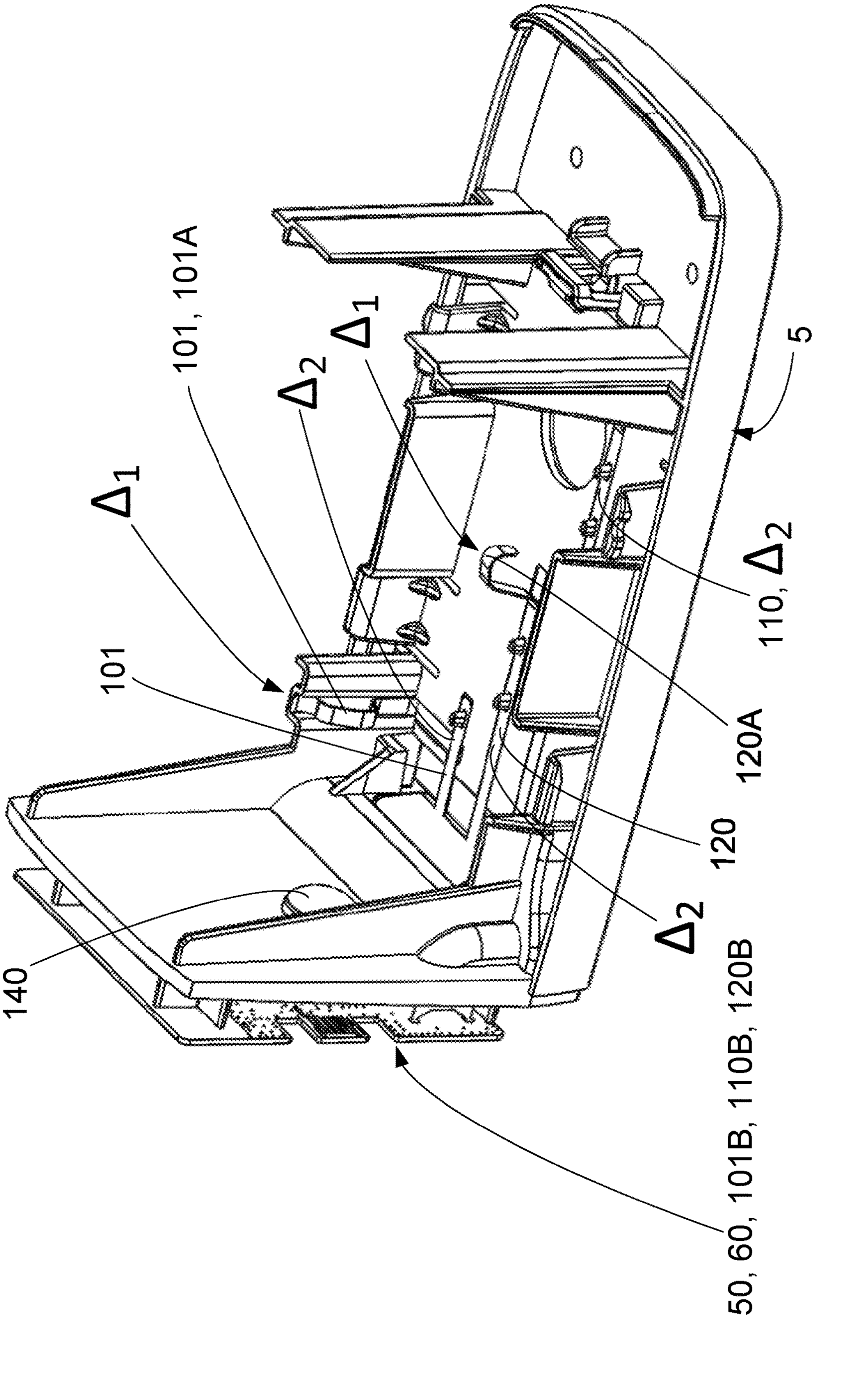
FIG. 5B shows in perspective the lower/larger detachable part/module of FIGS. 4A and 5A from another angle separately before the other inner part/module is assembled therein or after it is disassembled therefrom.
Figure 5C:
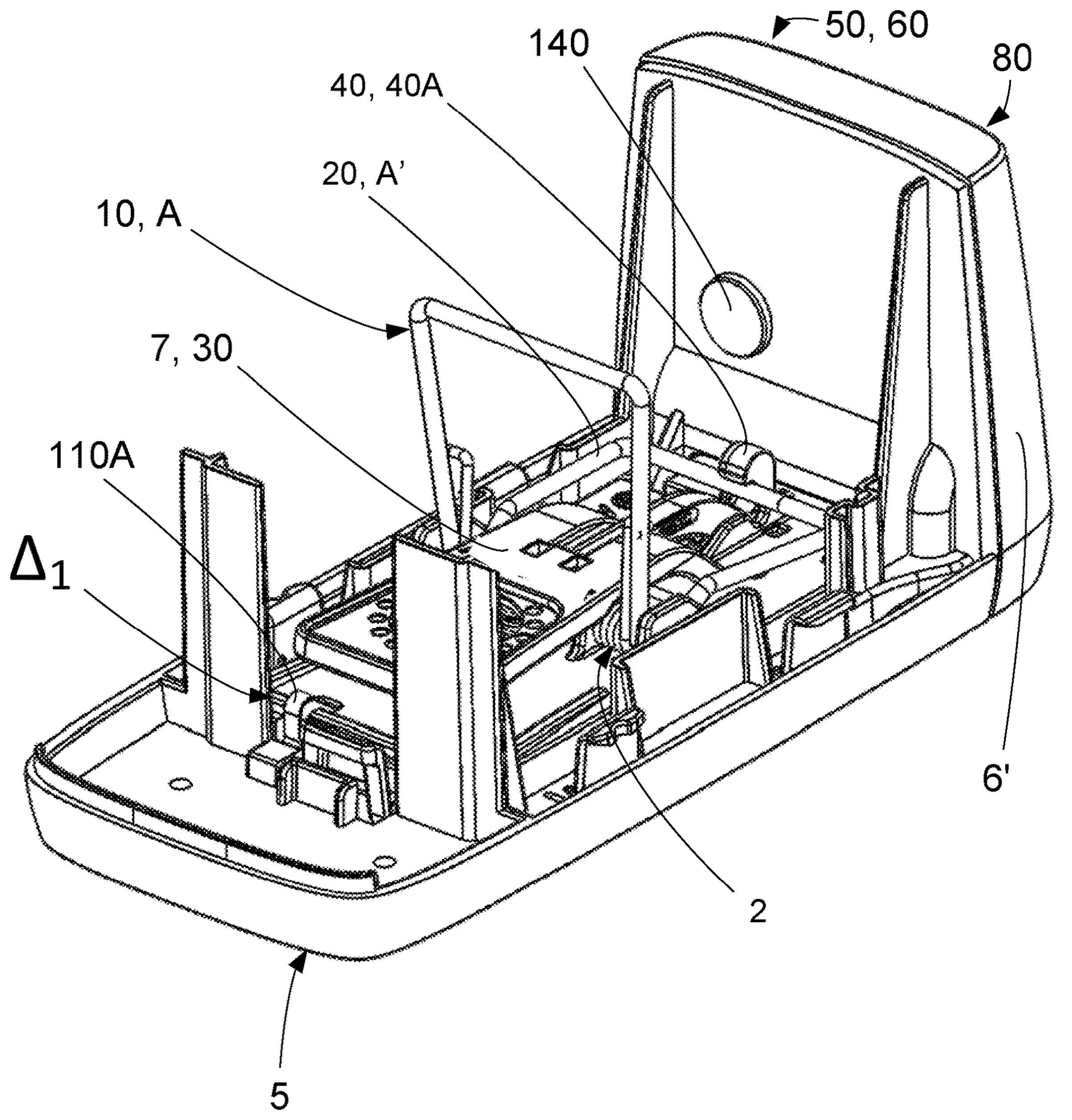
FIG. 5C shows in perspective the lower/larger detachable part/module of FIG. 4A before the other inner part/module is disassembled therefrom or after it is assembled therein with a third part/module assembled at one end to form part of the covering/housing of the rat trap.
Figure 6:
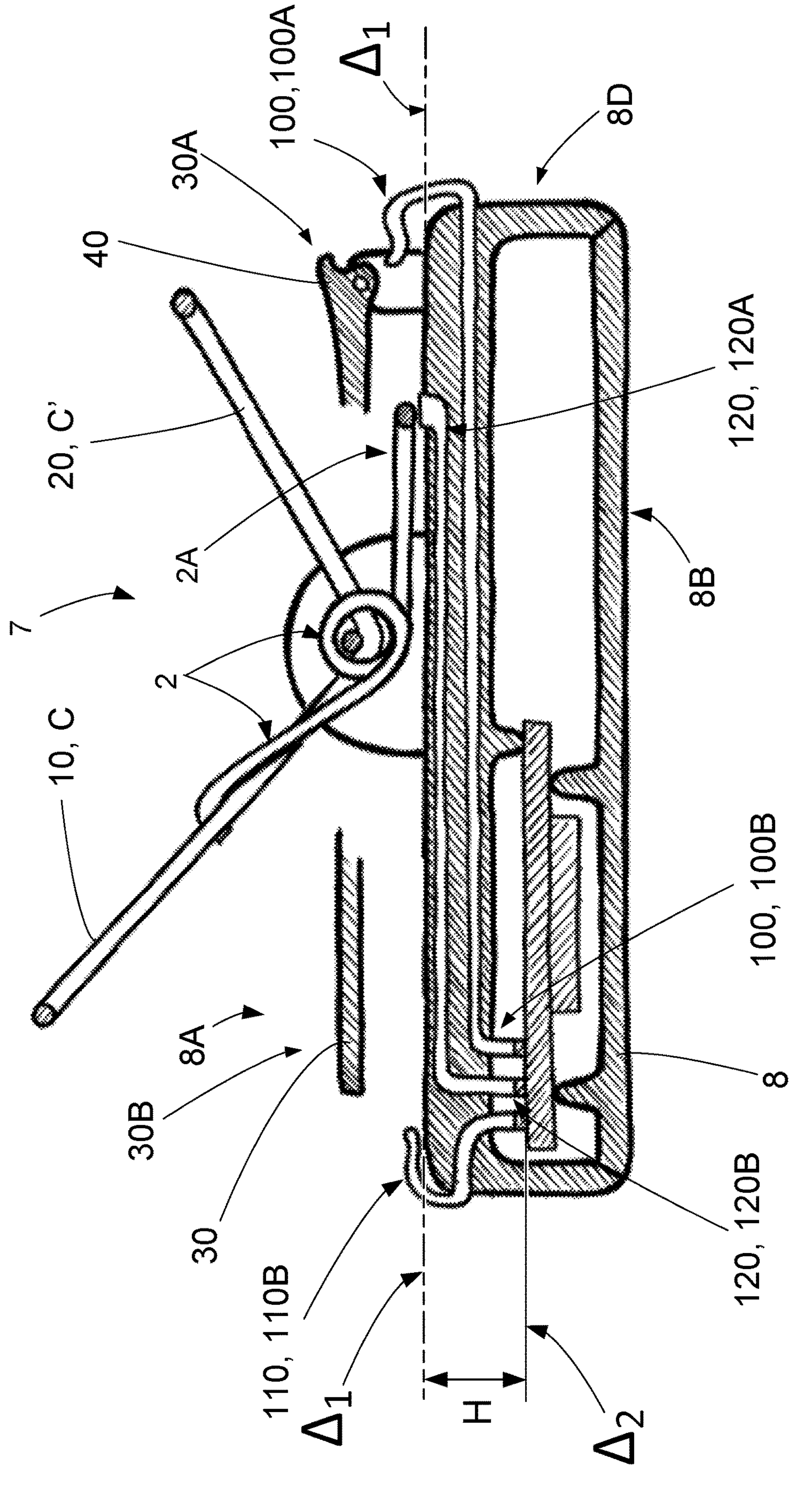
FIG. 6 shows in a sectional plane view from the side another aspect of an inner modular pest killing unit of the spring-loaded strike trap according to the invention.
Figure 8A:
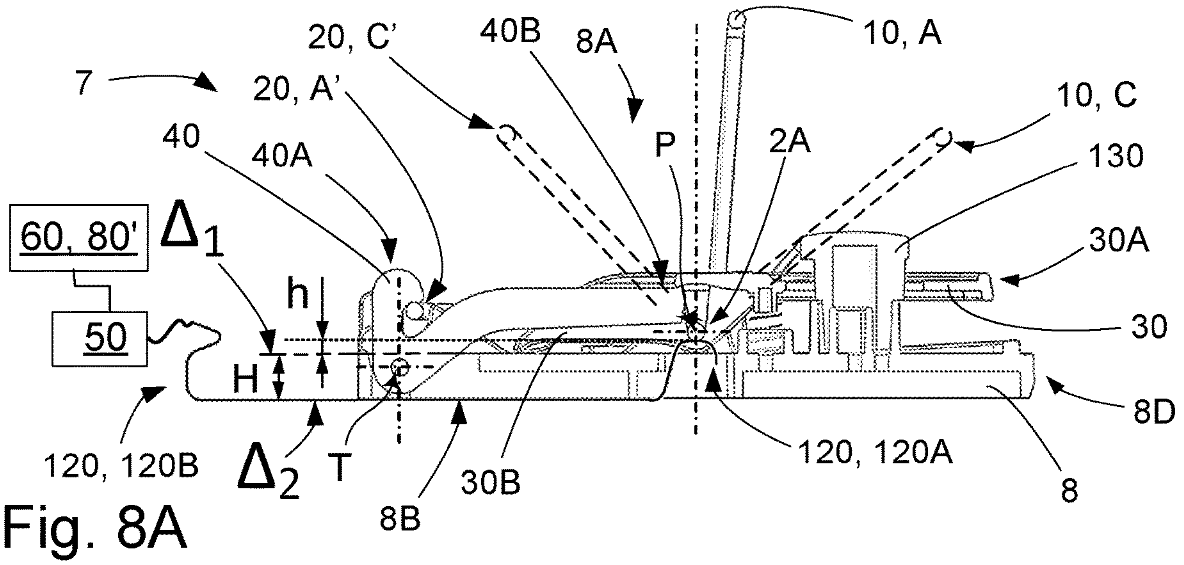
Figure 8B:
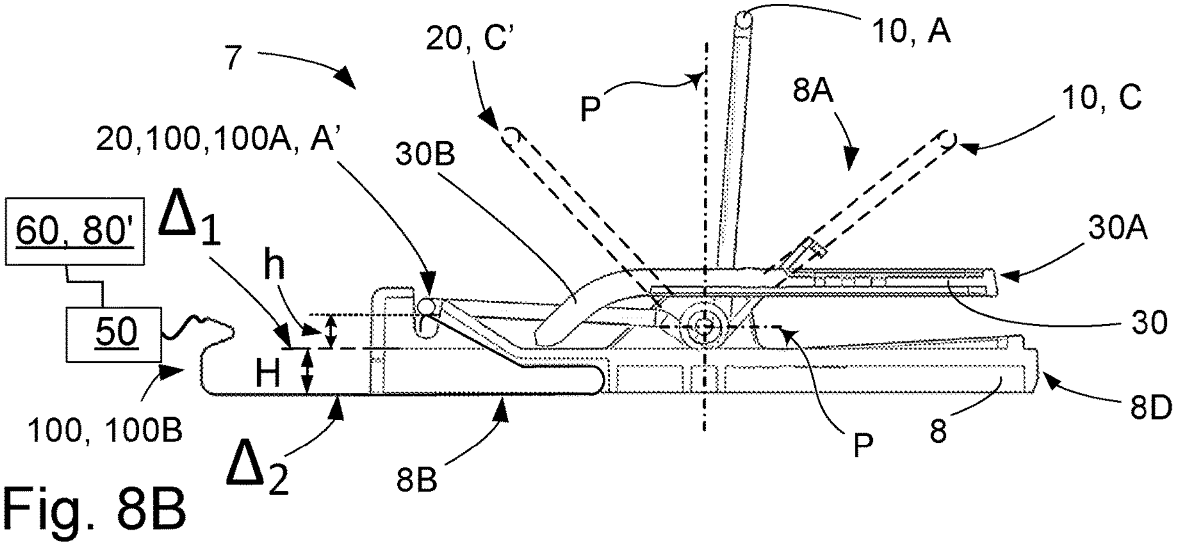
Figure 8C:
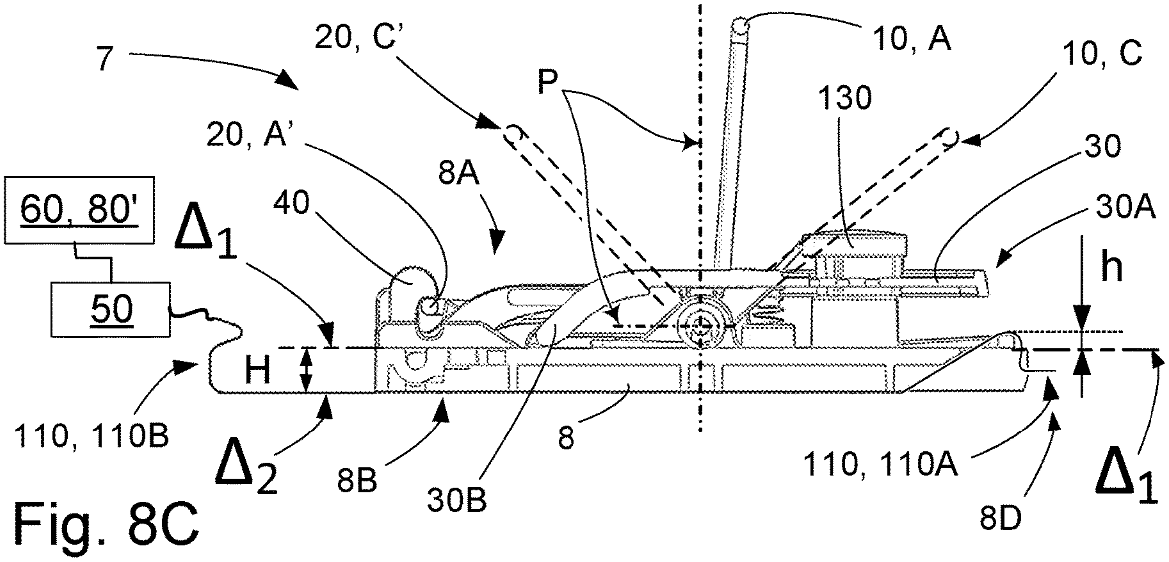

As shown in FIGS. 2A-2C, 2AA-2CC, 4A, 5, 5A-5C, 6, 7A-7B and 8A-8C/8BB, the ready indicator 100/101 and firing indicator 110 are elongated and flat and configured for extending from their first ends 100A, 101A, 110A at a position arranged on/at or above a first level $\Delta_1$ defined as extending along the plane of the upper bottom plate side 8A, towards the lower plate side 8B and along this lower plate side at a second level $\Delta_2$ defined as extending along the lower plate side towards and ending at their second ends 100B, 101B, 110B. The energiser 120 is elongated and flat configured for extending from a first end 120A at a position arranged on/at or above the first level $\Delta_1$ of the upper bottom plate side 8A, towards the lower plate side 8B and along this lower plate side at the second level $\Delta_2$ of the lower plate side towards and ending at a second end 120B. The indicators 100, 101, 110, 120 have different shapes and lengths but have at least one part extending lowest, i.e. extending along the second level $\Delta_2$ to enable coming into contact with any water or the like conductive fluid when present to indicate excess water level, e.g. to alert a house owner of water or sewage leakage of the like. FIGS. 8A to 8C/8BB show heights H and h, where H corresponds to the difference in level or distance or height between the two levels $\Delta_1$ and $\Delta_2$ and h corresponds to the difference in level or height between the first ends 100A, 101A, 110A, 120A of the indicators 100, 101, 110, 120 and the first level $\Delta_1$. In regard of the second level $\Delta_2$, this second level $\Delta_2$ is the same for the lowest part of all the indicators 100, 101, 110, 120 as seen in FIGS. 2A, 2AA, 2C, 2CC, 3, 5, 6, 7A-7B, 8A-8C/8BB, this being in particular clearly seen in FIGS. 2C and 2CC. This alignment of the indicators 100, 101, 110, 120 at the same second level $\Delta_2$ ensures a secure and repeatable indication of excess water or the like conductive fluid. This is common for all aspects.

Figure 9:
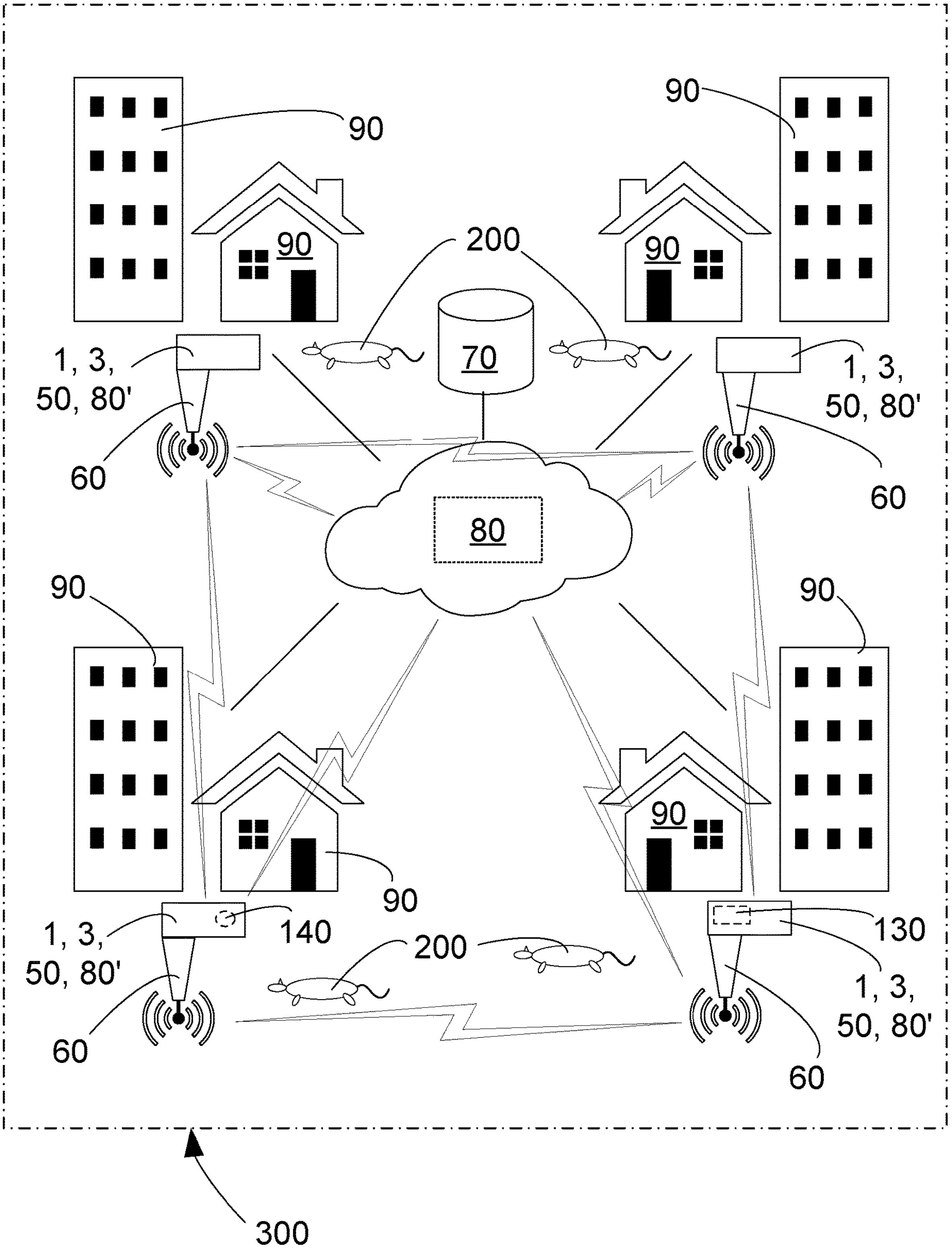
FIG. 9 shows a schematical illustration of a network or system according to an aspect of the invention comprising more than one rat trap according to FIGS. 1 to 8C/8BB.

A system/network 300 of traps 1 is schematically shown in FIG. 9 where the traps are arranged at/in houses 90. However, one or more traps 1 could be placed in sewers or the like. This system or trap network comprises at least two traps 1. These at least two traps 1 are operatively connected to cooperate for eliminating or at least reducing or at least minimising a population of rats and/or mice 200 in houses or before they reach the houses 90. These at least two traps 1 are configured to form a MESH network in which at least one and/or each and/or all traps continuously monitor presence of water or the like conductive fluid and that one or more of the traps is configured for registering if existing water or the like conductive fluid are at/over a certain/predetermined level, i.e. the second level $\Delta_2$ by use of the indicators 100, 101, 110, 120 that are conductively connected forming a closed circuit when the water or the like conductive fluid has reached the certain/predetermined level $\Delta_2$. This is common for all aspects.

One or more or each or all traps 1 comprises a communication device 60, such as a transmitter 60 for sending associated signals by wire and/or wirelessly depending on the number of traps 1 in the network 300 and/or their distance to each other and/or directly to one or more databases 70 and/or a central/external/internal unit or control unit or controller 80, 80' that is operatively connected to the one or more data bases of FIG. 9 (the sizes of the traps 1 and their equipment are not to scale in this figure and may be located under/below and/or outside and/or inside the houses 90 or sewers or the like). This communication between at least one trap 1 and at least one other trap 1 or directly between any of the traps 1 and the controllers 80/80' is achievable in many ways nowadays with the widespread technology. This is common for all aspects.

The principal functionality of the system/network 300 of traps 1 is enabled by one or more of the traps 1 being configured for registering if existing water or the like conductive fluid are at/over the certain/predetermined level $\Delta_2$ also being operatively connected to the central unit 80 and/or internal trap controllers 80' which is optionally operatively connected to the at least one data base 70. The registering of the closing of the circuit of the indicators 100, 101, 110, 120 when the water or the like conductive fluid has reached the predetermined level $\Delta_2$ is configured for triggering an alert signal (illustrated by lightning like arrows in FIG. 9) indicating excess water/conductive fluid that is sent to one or more of the other traps and/or to the central unit 80 that monitors all the traps and their functionality, which central unit is configured for notifying associated personnel of water/sewage leakage or the like. One or more of the traps 1 could be a master unit, i.e. a more intelligent trap 1.

One or more traps 1 could be placed in remote locations in large areas, e.g. industrial and/or production areas where cable connections are disproportionately expensive, then wireless communication as shown in FIG. 9 is preferred. Cable connections with power supply may, in some contexts, constitute a safety hazard caused by cable defects induced by e.g. pests, wherefore one or more batteries 50 in a trap 1 is preferred as power source.

In the context of traps 1 for pest control, it is desired, on the one hand, to achieve the longest possible service intervals between e.g. battery change or battery recharging to reduce costs. On the other hand, there is a need, when using traps 1, and in many countries a legal requirement, for quick removal of the rat/mouse 200 that was caught in the trap 1. This can be ensured by the individual trap 1 having long service intervals for e.g. battery change/charge and by the individual trap 1 being capable of reporting via one or more transmitters 60, with comparatively short delay, if something has happened in the trap 1, e.g. by a rat/mouse 200 caught in the trap 1 being detected via the indicators 100, 101, 110, 120. Such a solution is very attractive in the market and solves major practical problems in connection with trap installations with a large number of traps e.g. in hospital areas as the faulty triggering/misfire due to catching of small rats/mice is eliminated reducing manual work to check the traps 1. This also secures that the need for or a requirement for quick removal of pests from the trap 1 or comparatively frequent controls of each trap 1 are optimised.

The trap 1 for pest control may partake in a network, similar to the one 300 in FIG. 9, of decentralised traps 1 that wirelessly send data packages to the central unit 80 directly or indirectly by using other ones of the controllers 80' of decentralised traps 1 as intermediate stations. Such networks are known as e.g. the so-called MESH networks. They are often preferred since they are capable of ensuring, to a higher degree, communication with the most remote traps 1 and associated communication apparatuses 70, 80, 80' in the network 300 despite interruption of some of the network paths in the network, e.g. in case of temporary closing of metal doors or when placed in sewers of metal or when other signal-disturbing circumstances occur.

The wireless communication between the units 70, 80, 80' and traps 1, in the data network takes place in accordance with a network protocol, which may be a MESH network protocol or another open or proprietary protocol. The control units 80, 80' is/are therefore configured to implement the network protocol for executing transmission and repeater functionalities.

In some aspects, the control units 80 80' is/are provided with an identification code which is unique in the network 300 that the traps 1 is/are part of. One or more of the traps could also comprise a controller 80' as part of its own electronics controlling the trap 1, e.g. as a part of the operational components being the battery 50 and/or another controller of the trap 1 and wireless transmitter 60, and cooperating/controlling these entities. The internal trap controller 80' and/or external control unit 80 of the network 300 could also be configured with a timer. Exemplary, during the period when the controller 80'/control unit 80 is in its normal mode, it transmits its report during a time interval whose start is determined by the identification code and sets the transmitter or radio transceiver 60 to act as repeater. Via the network protocol, the controller 80'/control unit 80 ensures that dispatch of the report is not interrupted by its repeater function, e.g. by using mutually non-overlapping respective time intervals. A wireless transmitter/radio transceiver 60 has a receiver circuit and a transmitter circuit. The circuits can be integrated with each other or can be separate circuits. They will often share the same antenna. When the radio transceiver 60 acts as repeater, it will often use the transmitter and receiver circuits alternatingly. When the radio transceiver 60 dispatches the report, there is a need for the transmitter circuit. In some aspects, the receiver circuit is used in a unit for listening in on ongoing transmissions, if any, from other controllers 80' and/or control units 80 and/or traps 1 before the controller 80'/control unit 80 and/or trap autonomously/itself starts its transmission by the transmitter circuit.

A monitoring unit, e.g. in operative connection with the internal trap controller 80' may be built integrally into a trap 1 to the effect that it constitutes, along with the trap, a trap that can be activated to be in wireless communication with other apparatuses and/or traps 1 in a data network. Alternatively, such a monitoring unit can be made as a built-on or built-in unit that is configured for being directly compatible with an existing trap 1 or compatible upon modification of the existing trap. Such a monitoring unit could also be a function of the internal trap controller 80' that monitors the indication of any excess water or the like by means of the indicators 100, 101, 110, 120. The radio transmitter 60 is configured for converting a signal from the control unit 80' of a trap 1, typically a digital signal, to an airborne radio-wave signal via an antenna. The radio transmitter transmits and receives on one or more selected radio frequencies, e.g. frequency bands in the range around eg 433 MHz, 868 MHz, 2.4 GHz, 5 GHz, and/or 5.8 GHz.

The trap 1 optionally comprises a bait box 130 to lure the rodents 200.

Items

1. A spring-loaded strike rodent trap 1 comprising at least one spring 2, a housing 3, at least one striker bar 10, at least one arming bar 20, at least one trigger plate 30, and at least one trigger 40, the spring being configured for biasing the bars 10, 20 to move from a first position A, A', where the arming bar and the trigger plate is releasably held by the trigger and in contact with a ready indicator 100, 101 to indicate that the spring-loaded strike rodent trap 1 is charged, into at least one other position B, B', C, C' where the movement of the bars is stopped, after the spring-loaded strike rodent trap is triggered releasing the bars, characterized in that the striker bar 10, when the spring-loaded strike rat 1 trap is triggered releasing the striker bar, is either biased by the spring 2 into contact with a firing indicator 110 in a final/end position B, if a rat or mouse 200 is not hit, or biased into contact with a rat or mouse of a first/certain/predetermined size hitting and killing it in an intermediary position C not in contact with any of the indicators 100, 101, 110, and that the trigger plate 30 is configured for engaging the firing indicator 110 to displace the firing indicator a distance D, as measured in the direction of trigger plate movement, when a rat/mouse 200 having a second size/being smaller than the first/certain/predetermined size is hit by the striker bar 10, away from its location when the striker bar is in its final/end position B, towards another location where the firing indicator is not in contact with the striker bar.

2. A rodent trap 1 according to item 1, wherein the firing indicator 110 is made of a flexible material and/or has a shape making it flexible.
3. A rodent trap 1 according to item 1 or 2, wherein the ready indicator 100, 101 is made of a flexible material and/or has a shape making it flexible.
4. A rodent trap 1 according to any preceding item, wherein the firing indicator 110 is a conductor/made of a conductive material.
5. A rodent trap 1) according to any preceding item, wherein the ready indicator 100, 101 is a conductor/made of a conductive material.
6. A rodent trap 1 according to any preceding item, wherein the striking bar 10, the arming bar 20 and the trigger plate 30 are configured for rotating/pivoting around the same axis P.
7. A rodent trap 1 according to item 6, wherein the spring 2 is configured for biasing the striking bar 10 and the arming bar 20 to rotate/pivot around the same axis P, which axis P the trigger plate 30 is configured for pivoting around when triggered.
8. A rodent trap 1 according to item 6 or 7, wherein the striking bar 10 and the arming bar 20 both are made of conductive material and are configured for being in conductive connection with the same rotary/pivot axis P.
9. A rodent trap 1 according to item 8, further comprising an energiser 120 configured for being in conductive connection with the same rotary/pivot axis P as the striking bar 10 and the arming bar 20.
10. A rodent trap 1 according to any preceding item, wherein the spring 2, the striker bar 10, the arming bar 20, the trigger plate 30 and the trigger 40 are configured for being arranged on an upper side 8A of a bottom plate 8 for forming a detachable inner inset 7 configured for being a separate/autonomous inner part or module of the trap housing 3 when assembled therein.
11. A rodent trap 1 according to item 10, wherein the bottom plate 8 of the detachable inner inset 7 has the upper side 8A and a lower side 8B and the trigger plate 30 is configured for being movably/pivotally attached to the upper bottom plate side 8A via a rotary/pivot axis P extending substantially in parallel or in parallel with the extension plane of the bottom plate or its bottom plate side.
12. A rodent trap 1 according to item 10 or 11, wherein the bottom plate 8 of the detachable inner inset 7 has a plate shape defined by its upper side 8A and lower side 8B and two long sides 8C and two short sides 8D, the upper side and lower side are configured for forming substantially parallel and opposite planes extending substantially perpendicular to the long and short sides, which long and short sides are configured for forming pairwise substantially parallel and opposite sides relative each other, and the ready indicator 100, 101 comprises a first end 100A, 101A configured for being arranged at one of the short 8D or long 8C sides of the bottom plate for conductive connection with the arming bar 20 when in its first position A' when the detachable inner inset 7 is assembled as a removable inner part or module into the rodent trap 1 as charged.
13. A rodent trap 1 according to item 12, wherein the ready indicator 100, 101 comprises a second end 100B configured for being arranged at one of the other short 8D or long 8C sides of the bottom plate 8 in conductive connection with the arming bar 20 when the detachable inner inset 7 is assembled as a removable inner part or inner module into the rodent trap 1 as charged.
14. A rodent trap 1 according to any of items 10 to 13, wherein the ready indicator 100, 101 is configured for being arranged as a part of the detachable inner inset 7.
15. A rodent trap 1 according to any of items 10 to 14, wherein the firing indicator 110 is configured for being arranged as a part of the detachable inner inset 7.
16. A rodent trap 1 according to any preceding item, wherein the trap housing 3 comprises a detachable outer upper casing or covering 4 and a detachable outer bottom casing 5, which are configured for mating by being removably docketed together when the rat trap 1 is assembled and configured for disconnection when the rat trap is disassembled.
17. A rodent trap 1 according to any of items 10 to 15 or item 16 when dependent on any of items 10 to 14, further comprising a detachable inner insert 6, when assembled, which is configured for removably receiving the detachable inner inset 7 when the rodent trap 1 is assembled, the detachable inner insert 6 being configured for comprising a power source and/or a control unit 50, 80'.
18. A rodent trap 1 according to item 16 or claim 17 when dependent on item 16, wherein a detachable inner insert 6 or one or more outer coverings 4, 6' is configured for removable and/or fixedly mating/docketing with the detachable outer bottom casing 5 when the rodent trap 1 is assembled.
19. A rodent trap 1 according to item 17 or item 18 when dependent on item 17, wherein the ready indicator 100, 101 is configured for being arranged as a part of the detachable inner insert 6 or the inner inset 7.
20. A rodent trap 1 according to item 17 or item 18 when dependent on item 17 or item 19 when dependent on item 17 or 18, wherein the firing indicator 110 is configured for being arranged as a part of the detachable inner insert 6 or the inner inset 7.
21. A rodent trap 1 according to item 10 or any of items 11 to 20 when dependent on item 10, wherein the ready indicator 100, 101 and the firing indicator 110 are elongated and configured for extending from their first ends 100A, 101A, 110A at a position arranged on/at or above a first level $\Delta_1$ defined as extending along the plane of the upper bottom plate side 8A, towards the lower plate side 8B and along this lower plate side at a second level $\Delta_2$ defined as extending along the lower plate side towards and ending at their second ends 100B, 101B, 110B.
22. A rodent trap 1 according to item 9 and any of items 10 to 21 when dependent on item 9, wherein the energiser 120 is elongated and configured for extending from a first end 120A at a position arranged on/at or above the first level $\Delta_1$ of the upper bottom plate side 8A, towards the lower plate side 8B and along this lower plate side at the second level $\Delta_2$ of the lower plate side towards and ending at a second end 120B.

23. A rodent trap 1 according to item 22, wherein the energiser 120 is configured for being arranged at the pivot axis P in conductive connection with the arming bar 20 when the rodent trap 1 is charged and in conductive connection with a power source and/or a control unit 50, 80' when the detachable inner inset 7 is assembled as a removable inner part or inner module into the rodent trap 1 and configured for being in conductive connection with the striker bar 10 when the rodent trap is triggered and the striker bar has been released and come into conductive contact with the firing indicator 110 and configured for being in conductive connection with the ready indicator 100, 101 and the firing indicator 110 when water or the like conductive fluid has reached the second level $\Delta_2$.

24. A rodent trap 1 according to any preceding item, further comprising a movement and/or presence sensor 140 for detecting an event in the rodent trap 1 for pest control and for emitting a sensor signal in response to the event for direct communication with other rat traps and/or directly with a data base 70 and/or directly to or via a central/internal unit 80, 80' to one or more other rodent traps and/or data bases.

25. A rodent trap 1 according to item 24, wherein the movement and/or presence sensor 140 is a so-called passive infrared (PIR) sensor.

26. A rodent trap (1) according to any of items 10 to 15 or item 16 when dependent on any of items 10 to 14, further comprising an outer covering 6', when assembled, which is configured for at least removably or fixedly cover the detachable inner inset 7 when the rodent trap 1 is assembled, and/or a power source 50 and/or an internal trap controller 80'.

27. A system/network 300 of rodent traps 1 comprising at least two rodent traps 1 according to any of the preceding items, wherein these at least two rodent traps 1 are operatively connected to cooperate for eliminating or at least reducing or at least minimising a population of rats and/or mice 200, characterized in that these at least two rodent traps 1 are configured to form a MESH network in which at least one and/or each and/or all rodent traps continuously monitor presence of water or the like conductive fluid and that one or more of the rodent traps is configured for registering if existing water or the like conductive fluid are at/over a certain/predetermined level $\Delta_2$ by use of indicators 100, 101, 110, 120 that are conductively connected forming a closed circuit when the water or the like conductive fluid has reached the certain/predetermined level $\Delta_2$.

28. A system/network 300 of rodent traps 1 according to item 26, wherein the one or more of the rodent traps 1 configured for registering if existing water or the like conductive fluid are at/over a certain/predetermined level $\Delta_2$ is operatively connected to a central unit 80 and/or internal unit 80', whereby the registering of the closing of the circuit of the indicators 100, 101, 110, 120 when the water or the like conductive fluid has reached the predetermined level $\Delta_2$ is configured for triggering an alert signal indicating excess water/conductive fluid that is sent to one or more of the other rodent traps and/or to the central/internal unit that monitors all the rodent traps and their functionality, which central/internal unit is configured for notifying associated personnel of water/sewage leakage or the like.

NOMENCLATURE

1: Trap. 2: Spring. 3: Trap housing. 4: Upper casing/covering. 5: Detachable outer bottom casing. 6: Detachable inner insert. 6': Outer covering part. 7: Detachable inner inset. 8: Bottom plate of the detachable inner insert. 8A: Upper side of bottom plate 8. 8B: Lower side of bottom plate 8. 8C: First/Long side of bottom plate 8. 8D: Second/Short side of bottom plate 8. 9: Entry for pest/rodents of rat trap 1.

10: Beater/Striker/Killing arm/bar. 20: Arming bar. 30: Trigger plate. 30A: First trigger plate end. 30B: Second trigger plate end. 40: Trigger. 40A: First/Release end of trigger. 40B: Second/Anvil/Holder end of trigger. 50: Power source. 80': Internal control unit/controller of the trap.

60: Transmitter. 70: Data base. 80: Central unit/external control unit/controller. 90: House or the like.

100, 101: Start/First/Ready indicator/anvil. 100A, 101A: First end of ready indicator. 100B, 101B: Second ready indicator end.

110: End/Second/Firing indicator/anvil. 110A: First end of firing indicator. 110B: Second firing indicator end.

120: Other/Third indicator or Energiser. 120A: First end of energiser. 120B: Second end of energiser.

130: Bait box. 140: Movement and/or a presence sensor, e.g. a so-called passive infrared, PIR, sensor. 200: Rodent/Rat/Mouse. 300: System/Network of traps 1.

A: Start/First/Armed position for striker bar 10

B: Final or other and/or end/second position for striker bar 10

C: Second position and/or an intermediary end position for striker bar 10

A': First/Start or armed position for arming bar 20

B': Final or other and/or end/second position for arming bar 20

C': Second position and/or an intermediary end position for arming bar 20

We claim:

1. A spring-loaded strike animal trap comprising:

at least one spring, a housing, at least one striker bar, at least one arming bar, at least one trigger plate, and at least one trigger, where the at least one spring is configured to bias the at least one arming bar and the at least one striker bar to move from a first position into at least a second position, where, in the first position, the at least one arming bar and the at least one trigger plate are releasably held by the trigger and in contact with a ready indicator to indicate that the spring-loaded strike animal trap is charged, where, in the at least a second position, movement of the at least one arming bar and the at least one striker bar is stopped after the spring-loaded strike animal trap is triggered releasing the at least one arming bar and the at least one striker bar, wherein, when the spring-loaded strike animal trap is triggered and releases the at least one striker bar, the at least one striker bar is either biased by the spring into contact with a firing indicator in a second position if an animal is not hit, or is biased into contact with an animal of a predetermined size hitting and killing it, such that the at least one striker bar is disposed in an intermediary position not in contact with any of the indicators, wherein the at least one trigger plate is configured for engaging the firing indicator to displace the firing indicator out of the contact with the at least one striker bar in the second position when an animal moves the at least one trigger plate, wherein the animal spring-loaded strike trap further comprises a presence sensor configured for detecting movement and/or presence of an animal, wherein at least one of the ready indicator and the firing indicator is conductively connected in a manner that enables the animal trap to continuously monitor and detect presence of a conductive fluid by use of the at least one of the ready indicator and the firing indicator forming one or more closed circuits if a conductive fluid is at or over a predetermined level, wherein the presence sensor is configured to notify a detection of a presence of one or more animals and the at least one of the ready indicator and the firing indicator is configured to notify a detection of a presence of a conductive fluid, by emitting one or more signals from the spring-loaded strike animal trap for direct communication with one or more of: another animal trap, a data base, a central unit, and an internal unit, wherein the direct communication is capable of being relayed to one or more other animal trap(s), central unit(s), internal unit(s), and/or data base(s).

2. An animal trap according to claim 1, wherein the firing indicator includes a conductive material.

3. An animal trap according to claim 1, wherein the ready indicator includes a conductive material.

4. An animal trap according to claim 1, wherein one or both of the at least one striker bar and the at least one arming bar includes conductive material and is/are configured for being in conductive connection with a common pivot axis of the at least one striker bar and the at least one arming bar.

5. An animal trap according to claim 1, further comprising an energiser configured in conductive connection with a common pivot axis of the at least one striker bar and the at least one arming bar.

6. An animal trap according to claim 5, wherein the spring, the at least one striker bar, the at least one arming bar, the at least one trigger plate, and the at least one trigger are arranged on an upper side of a bottom plate to form a detachable inner inset configured for being a separate and/or autonomous inner part of the housing when the detachable inner inset is assembled within an interior volume of the housing.

7. An animal trap according to claim 6, wherein the bottom plate of the detachable inner inset has the upper side and a lower side and the at least one trigger plate is movably attached to an upper side of the bottom plate via a pivot axis extending substantially in parallel with or in parallel with a plane of the bottom plate or of a side of the bottom plate.

8. An animal trap according to claim 7, wherein the bottom plate of the detachable inner inset has a plate shape defined by its upper side, lower side, two long sides, and two short sides, where the upper side and lower side form substantially parallel and opposite planes extending substantially perpendicular to the long and short sides, wherein the long and short sides respectively form substantially parallel and opposite sides relative to each other, and the ready indicator comprises a first end disposed at one of the short or long sides of the bottom plate, in conductive connection with the at least one arming bar, when the at least one arming bar is in a first position.

9. An animal trap according to claim 8, wherein the ready indicator comprises a second end disposed at another of the short or long sides of the bottom plate, in conductive connection with the at least one arming bar when the spring-loaded strike animal trap is charged.

10. An animal trap according to claim 6, wherein each of the ready indicator and the firing indicator is elongated and is configured for extending from its respective first end at a position arranged at or above a first level towards a lower plate side and along this lower plate side at a second level, wherein the first level is defined as extending along the upper side of the bottom plate, and wherein the second level is defined as extending along the lower side of the bottom plate.

11. An animal trap according to claim 6, wherein the energiser is elongated and extends from a first end at a position at or above a first level along the upper side of the bottom plate, towards and along a second level along the lower side of the bottom plate, and ending at a second end of the energiser.

12. An animal trap according to claim 11, wherein the energiser is configured to be in conductive connection with the at least one arming bar at the common pivot axis of the at least one striker bar and the at least one arming bar when the spring-loaded strike animal trap is charged, is configured to be in conductive connection with a power source and/or a control unit when the detachable inner inset is assembled as a removable inner part or an inner module into the-spring-loaded strike trap, is configured to be in conductive connection with the at least one striker bar when the spring-loaded strike animal trap is triggered such that the at least one striker bar has been released and has come into conductive contact with the firing indicator, and is configured for being in conductive connection with the ready indicator and with the firing indicator when a conductive fluid has reached the second level.

13. An animal trap according to claim 1, wherein the presence sensor includes one or more of a passive infrared sensor, a mechanically-influenced contact switch, a temperature sensor, a camera, and a microphone.

14. An animal trap according to claim 6, further comprising:

an outer covering to removably or fixedly cover at least one of the detachable inner inset, a power source, and an internal trap controller.

15. A network of animal traps comprising at least two animal traps according to claim 1, wherein these at least two animal traps are operatively connected to each other in a manner to cooperate for eliminating or at least reducing a population of animals, wherein the at least two animal traps are configured to form a MESH network.

16. A network of animal traps according to claim 15, wherein one or more of the at least two animal traps is configured to register by closing of a circuit of one of the indicators if a conductive fluid is at or over the predetermined level and is operatively connected to and in communicative connection with a central unit, such that a registering triggers an alert signal indicating excess presence of conductive fluid, wherein the alert signal is sent—by wire and/or wirelessly—to one or more of the other animal traps, to a data base, and/or to a central unit, wherein the central unit is configured for notifying associated personnel.

17. A system comprising a first animal trap according to claim 1 and a second animal trap according to claim 1, wherein each of the first and the second animal trap comprises an internal controller, and the first animal trap or the second animal trap is configured as a master unit, wherein the first animal trap and the second animal trap are configured to communicate with one another by wire and/or wirelessly.

18. A method of using one or more animal traps according to claim 1 for one or more of monitoring and detecting and notifying presence of an animal, detecting a catch of an animal, and detecting the presence of excess conductive fluid above the predetermined level, and transmitting a signal in response to the detection(s) for direct communication—by wire and/or wirelessly—with one or more other animal traps, direct communication with a data base, direct communication with a central unit, direct communication with an internal controller, or communication via at least one of a central unit and an internal controller to one or more other animal traps, central units, internal controllers, and data bases.

19. A method of obtaining one or more signals—by wire and/or wirelessly—from an animal trap according to claim 1, indicating presence of at least one of an animal, catch of an animal, and presence of a conductive fluid at or above the predetermined level.

20. An animal trap comprising:

a housing;

a striker bar;

an arming bar;

a trigger plate arranged to be moved by an animal;

a trigger, said trigger releasably holding said arming bar and said trigger plate in a first configuration of said animal trap with said arming bar in contact with a ready indicator to indicate that said animal trap is charged, and a spring, said spring biasing the striker bar and the arming bar to move to a second configuration of said animal trap;

wherein the striker bar, in the second configuration, contacts a firing indicator;

wherein the trigger plate is configured for engaging said firing indicator to displace said firing indicator out of said contact with said striker bar when an animal moves said trigger plate.

21. The animal trap according to claim 20, wherein the firing indicator is flexible.

22. The animal trap according to claim 20, wherein the ready indicator is flexible.

23. The animal trap according to claim 20, wherein the firing indicator is a conductor.

24. The animal trap according to claim 20, wherein the ready indicator is a conductor.

25. The animal trap according to claim 20, wherein the striker bar, the arming bar, and the trigger plate are configured for rotating or pivoting around a common axis.

26. The animal trap according to claim 25, wherein the striker bar and the arming bar both are made of conductive material and are configured for being in conductive connection with the common axis.

27. The animal trap according to claim 25, further comprising an energizer configured for being in conductive connection with the common axis to enable a signaling path.

28. The animal trap according to claim 20, wherein the housing comprises a detachable outer upper casing or covering and a detachable outer bottom casing, which are configured for mating by being removably docketed together when the animal trap is assembled and configured for disconnection when the animal trap is disassembled.

29. The animal trap according to claim 20, wherein the ready indicator and the firing indicator are elongated and configured for extending from corresponding first ends thereof at a position arranged on/at or above a second level, defined as extending along a plane of an upper side of the bottom plate, towards a lower side of the bottom plate, and along the lower side of the bottom plate at a first level, defined as extending along the lower side of the bottom plate towards and ending at corresponding second ends of the ready indicator and the firing indicator.

30. The animal trap according to claim 29, further comprising an energizer that is elongated and configured for extending from a first end at a position arranged on/at or above the second level of the upper side of the bottom plate, towards the lower side of the bottom plate and along the lower side of the bottom plate at the first level of the lower side of the bottom plate towards and ending at a second end to enable a signaling path.

31. The animal trap according to claim 20, further comprising a movement or presence sensor for detecting an event in the animal trap for pest control and for emitting a sensor signal in response to the event for at least one of direct communication with other animal traps, directly with a data base, and directly to or via a central/internal unit to at least one of one or more other animal traps and data bases.

32. The animal trap according to claim 31, wherein the movement or presence sensor is a passive infrared (PIR) sensor.

33. The animal trap according to claim 20, further comprising an outer covering, which is configured for at least removably or fixedly covering at least a power source, and an internal trap controller.

34. A system/network of animal traps, the system/network comprising:

a first animal trap; and a second animal trap comprising:

a housing;

a striker bar;

an arming bar;

a trigger plate arranged to be moved by an animal;

a trigger, said trigger releasably holding said arming bar and said trigger plate in a first configuration of said animal trap with said arming bar in contact with a ready indicator to indicate that said animal trap is charged, and a spring, said spring biasing the striker bar and the arming bar to move to a second configuration of said animal trap;

wherein the striker bar, in the second configuration, contacts a firing indicator;

wherein the trigger plate is configured for engaging said firing indicator to displace said firing indicator out of contact with said striker bar when an animal moves said trigger plate;

wherein the first animal trap and the second animal trap are operatively connected to cooperate for eliminating or at least reducing or at least minimizing a population of animals; and wherein the first animal trap and the second animal trap are configured to form a MESH network in which at least the second animal trap, when active, continuously monitors presence of water or a conductive fluid and at least the second animal trap is configured for registering if existing water or a conductive fluid are at/over a certain/predetermined level by use of indicators that are conductively connected forming a closed circuit when the water or the conductive fluid has reached the certain/predetermined level.

35. The system/network of animal traps according to claim 34, wherein the second animal trap is configured for registering if existing water or the conductive fluid are at/over the certain/predetermined level is operatively connected to at least one of a central unit and an internal unit, whereby a registering of closing of the circuit of the ready indicator and the firing indicator when the water or the conductive fluid has reached the predetermined level is configured for triggering an alert signal indicating excess water/conductive fluid that is sent to at least one of the second animal trap, the central unit, and the internal unit that monitors the first animal trap and the second animal trap and their functionality, wherein at least one of the central unit and the internal unit is configured for notifying associated personnel of water or sewage leakage.

* * * * *